United States Patent
McCarty

(10) Patent No.: US 9,495,367 B2
(45) Date of Patent: Nov. 15, 2016

(54) SYSTEM AND METHOD FOR PERFORMING A SOFTWARE COMPARISON

(75) Inventor: Joel McCarty, Oklahoma City, OK (US)

(73) Assignee: ATC Logistics & Electronics, Inc., Fort Worth, TX (US)

(*) Notice: Subject to any disclaimer, the term of this patent is extended or adjusted under 35 U.S.C. 154(b) by 218 days.

(21) Appl. No.: 13/587,587

(22) Filed: Aug. 16, 2012

(65) Prior Publication Data
US 2012/0311718 A1 Dec. 6, 2012

Related U.S. Application Data

(63) Continuation-in-part of application No. 12/940,331, filed on Nov. 5, 2010.

(51) Int. Cl.
| | |
|---|---|
| G06Q 50/28 | (2012.01) |
| G06F 17/30 | (2006.01) |
| G06Q 10/06 | (2012.01) |
| G06Q 10/08 | (2012.01) |
| G06Q 10/00 | (2012.01) |
| G06Q 99/00 | (2006.01) |

(52) U.S. Cl.
CPC ......... G06F 17/30073 (2013.01); G06Q 10/00 (2013.01); G06Q 10/0631 (2013.01); G06Q 10/087 (2013.01); G06Q 10/30 (2013.01); G06Q 50/28 (2013.01); G06Q 99/00 (2013.01)

(58) Field of Classification Search
None
See application file for complete search history.

(56) References Cited

U.S. PATENT DOCUMENTS

| | | | |
|---|---|---|---|
| 6,822,422 B2 * | 11/2004 | Sagawa | 320/109 |
| 7,076,449 B2 * | 7/2006 | Tsunenari et al. | 705/26.1 |
| 7,363,567 B2 | 4/2008 | Rands | |
| 2003/0004734 A1 | 1/2003 | Adler et al. | |
| 2003/0009465 A1 | 1/2003 | Brown et al. | |
| 2004/0123281 A1 * | 6/2004 | Olrik | H04M 1/72525 717/168 |
| 2004/0193610 A1 * | 9/2004 | Alex et al. | 707/10 |
| 2005/0071032 A1 | 3/2005 | Urabe | |
| 2006/0031673 A1 * | 2/2006 | Beck | G06F 21/565 713/164 |
| 2006/0075128 A1 * | 4/2006 | Kotler et al. | 709/229 |
| 2007/0173959 A1 * | 7/2007 | Chandhoke | 700/40 |
| 2008/0027581 A1 * | 1/2008 | Saether et al. | 700/245 |
| 2008/0059970 A1 | 3/2008 | Gonen | |
| 2008/0281691 A1 * | 11/2008 | Pearson et al. | 705/14 |
| 2008/0296374 A1 * | 12/2008 | Gonen et al. | 235/385 |
| 2009/0014363 A1 | 1/2009 | Gonen et al. | |
| 2009/0049207 A1 * | 2/2009 | Reynolds et al. | 710/16 |
| 2009/0115600 A1 | 5/2009 | Lee et al. | |

(Continued)

FOREIGN PATENT DOCUMENTS

| | | | | |
|---|---|---|---|---|
| EP | 1705872 | * | 9/2006 | H04L 28/08 |

OTHER PUBLICATIONS

Paul White (2011). Understanding and Using Parallelism in SQP Server. Simple Talk.*

(Continued)

Primary Examiner — Peter L Ludwig
(74) Attorney, Agent, or Firm — McGuireWoods LLP

(57) ABSTRACT

A system and method for performing software verification for one or more electronic devices. A memory of an electronic device is scanned for electronic references. The electronic references of the electronic device are determined in response to the scanning. The electronic references of the electronic device are compared against standard electronic references to determine results. The electronic device is processed in response to the results.

9 Claims, 14 Drawing Sheets

(56) References Cited

U.S. PATENT DOCUMENTS

| | | | |
|---|---|---|---|
| 2009/0186603 A1 | 7/2009 | Usami et al. | |
| 2010/0088305 A1* | 4/2010 | Fournier | 707/706 |
| 2010/0161397 A1 | 6/2010 | Gauthier et al. | |
| 2010/0228676 A1* | 9/2010 | Librizzi et al. | 705/306 |

OTHER PUBLICATIONS www.n-gage.com (latest date of Feb. 14, 2012), Get Apps for your Nokia device, retrieved on Feb. 7, 2013 from www.n-gage.com and then further found on www.archive.org wayback machine (hereinafter "Nokia").*

Hastings, H & Sande, S. (Dec. 2009) White Paper: Considerations for developing an IT disposal policy. CA IT Asset Management.

ATC Logistics & Electronics (Jul. 23, 2010). Improving the Consumer Experience: Protecting brand integrity with advanced 3PL services. White Paper, www.atcle.com.

Cairns, C.N. (2005). E-Waste and the consumer: Improving Options to Reduce, Reuse and Recycle. IEEE, p. 237-242.

ATC Logistics & Electronics (Dec. 8, 2009). Asset Recovery, Green Logistics: Sustainable 3PL Practices for reverse logistics and asset management. White Paper, www.atcle.com.

Van der Vorst et al. (2005) "Innovations in Logistics and ICT in Food Supply Chain Networks".

Xiong Ben Hai, et al. (2007): A practical web-based tracking and traceability information system for the pork products supply chain, New Zealand Journal of Agricultural Research, 50:5, 725-733.

New Jersey Comptroller Fines State Agencies Failed to Remove Confidential Information from Computer. SDB. Mar. 24, 2011.

Coia, A. (Oct. 2003). Thinking in reverse—Transportation series; electronics recycling. Recycling Today.

Brannon, C (2006). Unique Reverse Logistics Challenges of IT Asset Disposition. Reverse Logistics Magazine.

International Search Report and Written Opinion date mailed Apr. 17, 2012; PCT International Patent Application No. PCT/US11/58667.

The examiner defines "quarantine" as "a period of isolation or detention". See World English Dictionary, Collins English Dictionary, Coplete Unabridged 10th Edition (2009).

Feick, D. (Jan. 2011). Cambridge company welcomes your 'e-waste'. Going Green: A special advertising feature.

Zulhuda (2012) The state of e-government security in Malaysia: reassessing the legal and regulatory framework on the threat of information theft. Int'l Islamic Univ. of Malaysia.

* cited by examiner

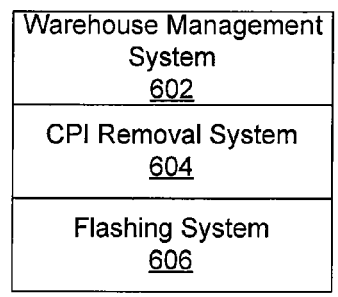
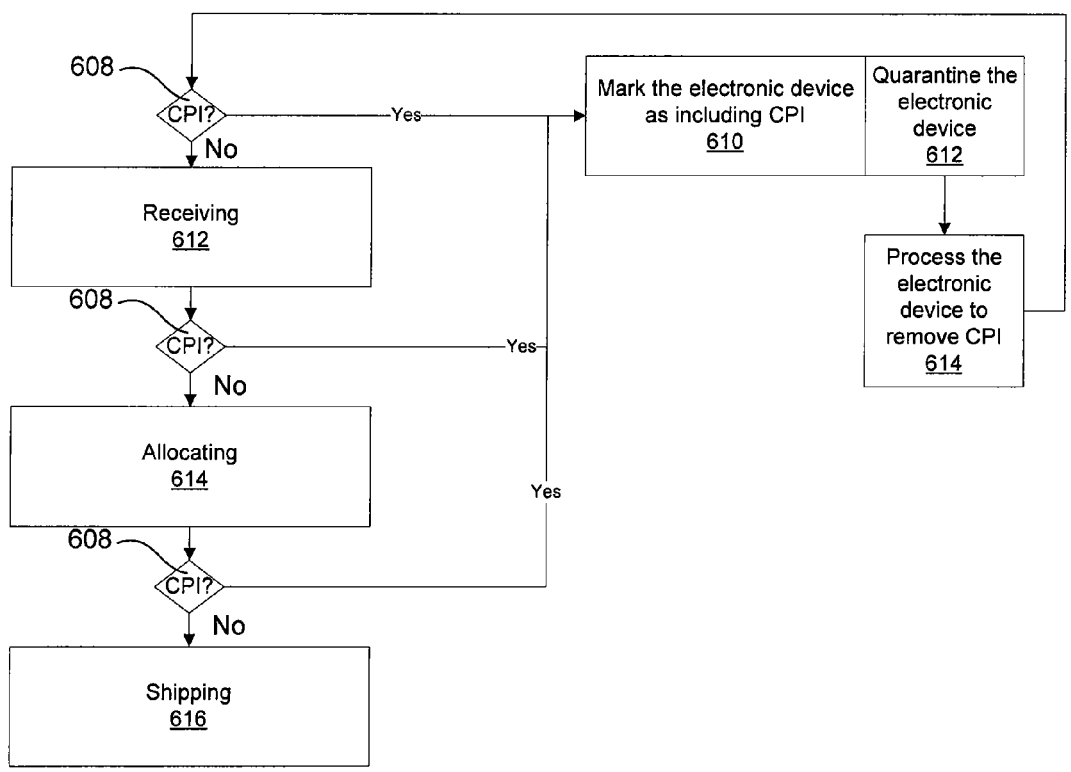
FIG. 6

FIG. 7

| Graphical User Interface | | 700 |
|---|---|---|

✓ CPI Cleared

☐ CPI Present

| Username | Dswen |
|---|---|
| Password | ******** |
| Customer/Company ID | 24548 |

CPI Information

☐ Device Identifier/IMEI

☐ File/Memory Location:_____

☐ File Type:_____

☐ Device received from:_____

☐ Date CPI cleared:_____

☐ Individual performing CPI removal:_____

☐ CPI removal reported with the receipt of the report received? Date:_____

☐ Individual performing CPI removal:_____

Device Functional

☑ Operating System Restored

☑ Co-branding Restored: Graphics, ringtone, theme

☑ Settings: Radio on, language options, security certificates

☑ Included memory devices cleared

☑ Applications installed:_____

SYSTEM AND METHOD FOR PERFORMING A SOFTWARE COMPARISON

CROSS-REFERENCE TO RELATED APPLICATIONS

This application is a Continuation-In-Part of U.S. patent application Ser. No. 12/940,331 filed Nov. 5, 2010 entitled "SYSTEM AND METHOD FOR REMOVING CUSTOMER PERSONAL INFORMATION FROM AN ELECTRONIC DEVICE", which is a co-pending application of U.S. patent application Ser. No. 12/940,411 entitled "SYSTEM AND METHOD FOR FLASHING A WIRELESS DEVICE" filed on Nov. 5, 2010; Ser. No. 12/940,346 entitled "SYSTEM AND METHOD FOR AUDITING REMOVAL OF CUSTOMER PERSONAL INFORMATION ON ELECTRONIC DEVICES" filed on Nov. 5, 2010; and Ser. No. 12/940,299, entitled "SYSTEM AND METHOD FOR TRACKING CUSTOMER PERSONAL INFORMATION IN A WAREHOUSE MANAGEMENT SYSTEM" filed on Nov. 5, 2010. This application is also a co-pending application of Ser. Nos. 13/587,609 and 13/587,570 entitled "SYSTEM AND METHOD FOR REMOTELY FLASHING A WIRELESS DEVICE" and "SYSTEM AND METHOD FOR SYSTEMATICALLY REMOVING CUSTOMER PERSONAL INFORMATION FROM AN ELECTRONIC DEVICE" both filed concurrently herewith. The teachings and disclosures of which are each hereby incorporated in their entireties by reference thereto.

BACKGROUND

The use of and development of communications has grown nearly exponentially in recent years. The growth is fueled by larger networks, more reliable protocols, enhanced software functionality, and better communications hardware available to service providers and consumers. As a result, more people than ever are buying and using electronic devices. Correspondingly, the number of returns, repairs and refurbishments are at record levels creating logistical problems.

Under various circumstances, users may return electronic devices to an original equipment manufacturer (OEM), retailer, repair facility, service provider, or other entity. Electronic devices are often returned for repairs, refurbishment, exchanges, warranty issues, or any number of other justified or arbitrary reasons. It is imperative that any electronic device that has been returned be cleared of all personal information, sensitive data, or other information linked to a previous user. If the personal information is not removed, applicable laws, industry standards, and common business practices may be violated. For example, the personal information may be used by another party to perpetrate an act of identity theft. Similarly, the privacy of a previous user may be otherwise violated.

SUMMARY

One embodiment provides a system and method for performing software verification for one or more electronic devices. A memory of an electronic device may be scanned for electronic references. The electronic references of the electronic device may be determined in response to the scanning. The electronic references of the electronic device may be compared against standard electronic references to determine results. The electronic device may be processed in response to the results.

Another embodiment provides a system for determining electronic references of one or more electronic devices. The system may include a server configured to execute a software verification application. The system may also include one or more interfaces for communicating with the one or more electronic devices. The software verification application may be operable to scan memories of the one or more electronic devices for electronic references, determine the electronic references including in the one or more electronic devices in response to the scanning, compare the electronic references of the one or more electronic devices against standard electronic references to determine results, and process the one or more electronic device in response to the results.

Yet another embodiment provides a computing device operable to verify one or more electronic devices. The computing device may include a processor configured to execute a set of instructions and a memory configured to store the set of instructions. The set of instructions may be executed to scan memory of the one or more electronic devices for electronic references, determine the electronic references including in the one or more electronic devices in response to the scanning, compare the electronic references of the one or more electronic devices against standard electronic references to determine results, and process the one or more electronic devices in response to the results.

BRIEF DESCRIPTION OF THE DRAWINGS

Illustrative embodiments of the present invention are described in detail below with reference to the attached drawing figures, which are incorporated by reference herein and wherein:

FIG. 6 is a flowchart of a process for auditing electronic devices for CPI during processing in accordance with an illustrative embodiment;

FIG. 7 is a pictorial representation of a graphical user interface for removing CPI from an electronic device in accordance with an illustrative embodiment;

DETAILED DESCRIPTION OF THE DRAWINGS

Figure 1:
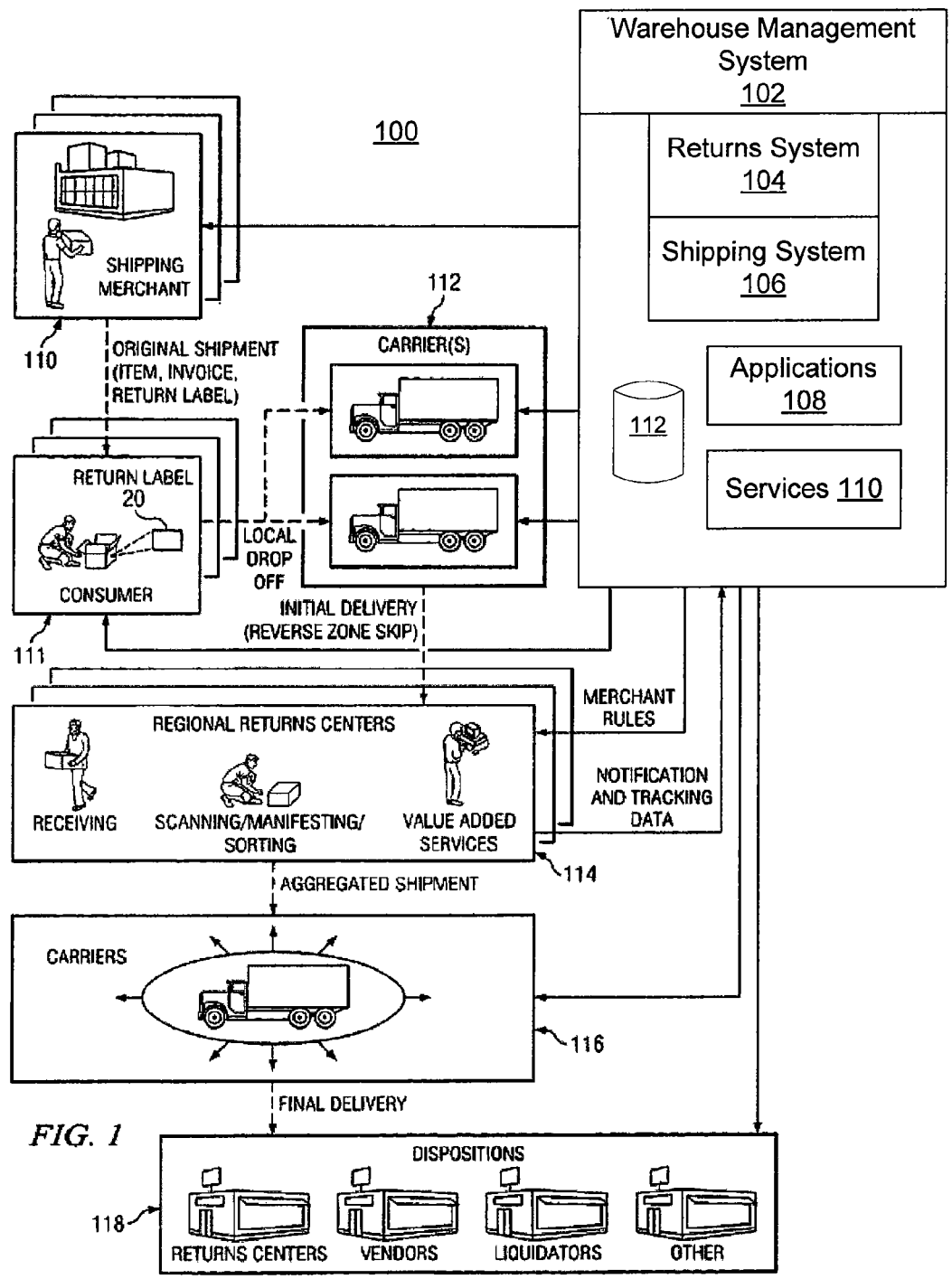
FIG. 1 is a pictorial representation of a merchandising process in accordance with an illustrative embodiment.

The illustrative embodiments provide a system and method for detecting, tracking and removing customer private information (CPI) from electronic devices. As defined herein, removing and managing CPI includes managing and adding co-branding, default content, settings, functionality, memory card status, and customer information that may be reset, removed, or restored in order to return the electronic devices to an acceptable state. CPI is removed from electronic devices in order to ensure the electronic devices may be repaired, exchanged, substituted or otherwise recycled for usage. The co-branding, default content, and settings are verified to ensure that the electronic device is still functional for a user and able to communicate through a communications service provider.

The detection of and removal of CPI allows service providers and other organizations to comply with applicable laws, meet industry standards and maintain good relationships with consumers, retailers, service providers and others that may utilize the electronic device or provide services for those electronic devices. The illustrative systems are further operable to record and audit compliance of CPI removal or non-removal during processing of an electronic device.

In logistical, returns, and warehousing facilities and systems, one or more checks, determinations, scans, or searches for CPI may be performed before or after standardized processes, such as receiving, allocation, and shipping. The facilities in which CPI removal or detecting are performed may also include retail stores, merchandising outlets, service centers, refurbishers, audit locations, and other parties, services, and operations that sell or otherwise process electronic devices.

Electronic devices may include computing and telecommunications devices including cell phones, PDAs, smartphones, laptops, e-readers, mp3 players, and other forms of personal, business, or consumer electronic devices. CPI may include information, such as names, phone numbers, addresses, e-mail addresses, IP addresses, social security numbers, databases, email addresses, bank accounts, contact lists, address books, passwords, usernames, and other sensitive information associated with the user or utilized by the user.

The inability to properly remove CPI may result in identity theft, consumer bad will, contract or legal violations, and other undesirable effects or outcomes. In various embodiments, the CPI removal and detection process may be utilized or integrated into warehouse management operations, returns or shipping systems logistics services, and systems and devices that are utilized to process electronic devices or other goods. The electronic devices are processed by determining or detecting whether CPI is present on the electronic device, removing the CPI if necessary and reporting the removal or non-removal of CPI on devices that are being processed or have previously been processed to provide an audit trail as well as trend analysis information to interested parties. The CPI removal process further ensures that the electronic devices are properly configured and include the software specified by the OEM, service provider, or other controlling entity.

The embodiments as herein described, may be automated or may require user interaction. In particular, the illustrative embodiments provide a system and method for tracking CPI that is detected within processed or unprocessed electronic devices and implementing CPI removal as well as tracking. The illustrative embodiments may be utilized to check for (or check and clear) CPI from electronic devices (also referred to as detect or detect and delete). All electronic devices with CPI may be identified with relevant information or metadata stored for local or distributed utilization by one or more parties. As a result, any number of parties may quickly determine whether CPI is present, and if so, steps may be taken to remove the CPI and ensure that electronic devices with CPI are not distributed into the stream of commerce or processed in facilities without first being cleared of the CPI in real-time or in the future.

FIG. 1 is a pictorial representation of a merchandising process in accordance with an illustrative embodiment. In one embodiment, the merchandising process 100 of FIG. 1 may be implemented by a warehouse management system (WMS) 102. The WMS 102 may include a returns system 104, a shipping system, applications 108, services 110, and databases 112. The merchandising process 100 and WMS 102 may be utilized to receive, process, and ship electronic devices. Additionally, the WMS 102 may audit the detection and removal of CPI during any part of the merchandising process 100.

During all or any step or portion of the merchandising process 100, electronic devices may be analyzed to determine whether CPI is present and, if present, to remove the CPI so that the electronic device may be further processed. In one embodiment, electronic devices may be randomly tested during the merchandising process 100 to determine whether CPI is present. The WMS 102 is one embodiment of an information and data processing system that tracks and records the processing of the electronic devices through one or more facilities. FIG. 1 illustrates both the flow of packages, inventory, and electronic devices as well as data flow (as described by the included legend).

The WMS 102 is used to collect data scanned from return labels, and to process the returns. The processing center 102 includes computer processing equipment, including computers, data storage, scanners (i.e., barcode, RFID, etc) and networking equipment, appropriate for communication of data to and from returns centers, merchants, and customer, as appropriate.

The computing equipment is programmed to fulfill the various data processing and CPI removal services described herein. In one embodiment, the WMS 102 includes nodes, computers, access points, terminals, or other elements for displaying information, receiving user input, and scanning the electronic devices as moved through each stage of the merchandising process 100. For example, WMS 102 may provide a web page or other network-accessible data source, accessible by customers for obtaining information about returns and data for printing return labels. The WMS 102 also stores business rules from merchants, which may be delivered to it by electronic transmission over a data communications network. As explained below, the WMS 102 matches data on the return label to the merchant rules, which may specify disposition of the package or other rules for handling and/or to an identifier associated with an electronic device, the return.

Figure 3:
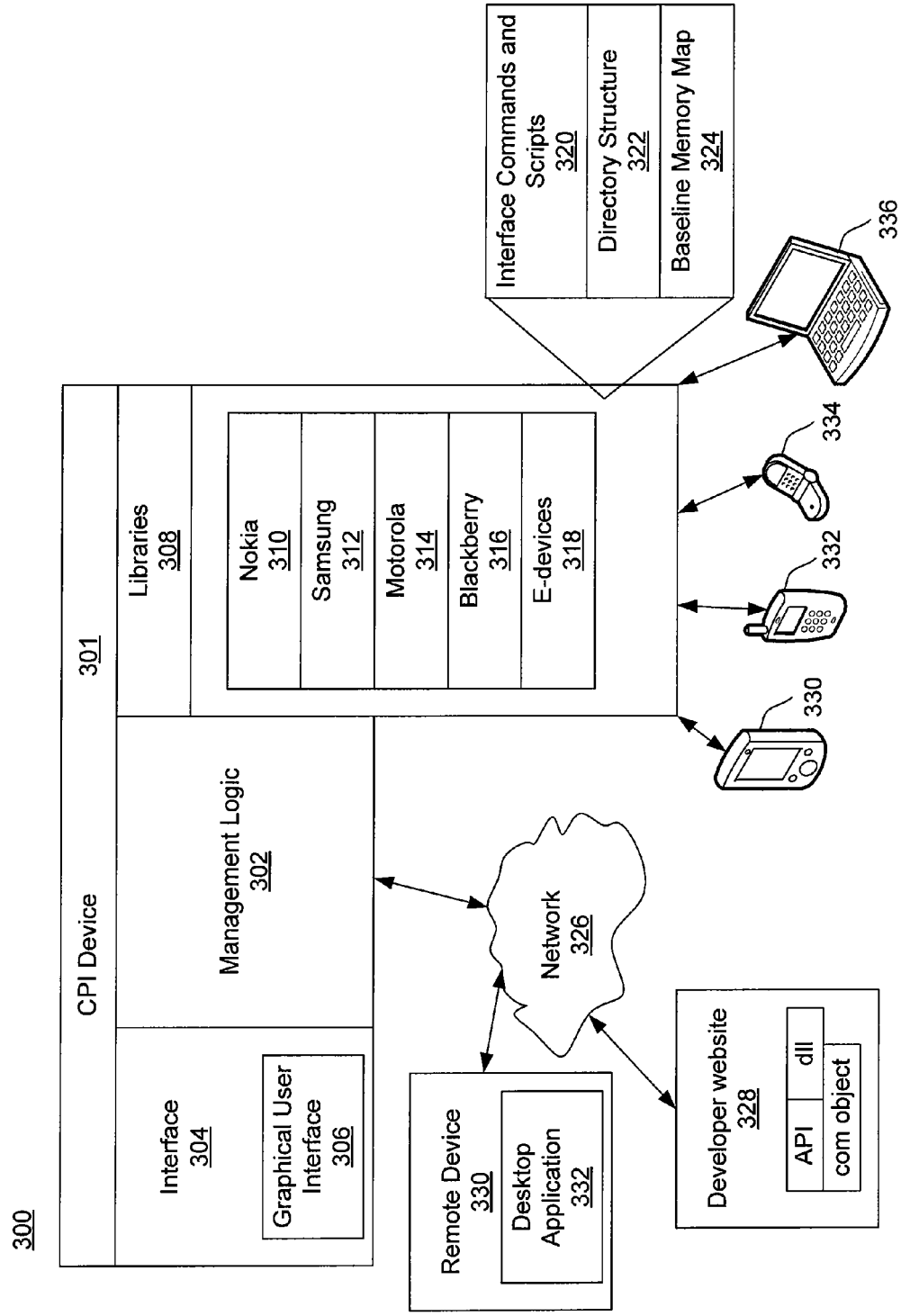
FIG. 3 is a block diagram of a system for merging CPI in accordance with an illustrative embodiment.

The WMS 102 may include a CPI device operable to determine whether CPI is present on one or more electronic devices as described in FIG. 3. The returns system 104 and shipping system 106 may be modules, instructions, or hardware elements dedicated to tracking returns and shipping of electronic devices, respectively. The applications 108 may represent any number of standard or customized applications that may be part of the WMS 102. The services 110 may represent other features and services that may be provided during the merchandising process 100 and/or by the WMS 102.

The database 112 may store information about electronic devices and other inventory that is tracked as it moves through the merchandising process 100. In one embodiment, the database 112 may store information regarding the co-branding information (i.e. graphics, ringtone, themes, etc) for each electronic device, default content (e.g. operating system version, applications, etc), settings, and clearing functions (i.e. reflash, master clear, master reset, etc.) that have been run on each electronic device. In one embodiment, the database 112 may store libraries or scripts that are utilized for each device according to applicable service provider, manufacturer, type, and issue to ensure that the electronic device is cleared of CPI and configured.

In particular, the database 112 may track information relating to the detection and removal or attempted removal of CPI from electronic devices. For example, the WMS 102 may record when CPI was first detected, the operator and system detecting the CPI, the quarantine process including marking the device physically and electronically as quarantined, and the process for removing or attempting to remove the CPI in finite detail. In one embodiment, the returns system 104 or the shipping system 106 may generate a quarantine label indicating that the device is at least temporarily quarantined. For example, the label may include a barcode or other scannable identifier.

The applications 108, services 110, and database 112 may communicate with one or more internal or external networks to receive updates, data, and information, and communicate status, tracking, and other information regarding the processing of electronic devices. For example, the services 110 may send automated messages to a service provider based on the database 112 indicating that CPI has been found on incoming device(s) that relates to the service providers processes and business. In addition, the service provider, retailer, or other third party may receive notices according to rules utilized by the WMS 102 when electronic devices are received, value added services are performed (i.e. repair, refurbishment, etc), and when the shipping label is generated to fulfill an order. The rules between the returns provider and service provider govern communications, notifications, and remote access to the WMS 102.

In one embodiment, returns are processed through a returns provider that manages and logistically handles returns for multiple merchants. The systems and methods herein described may also be easily adapted for a returns provider that handles only returns for a single merchant. In either case, the merchant is considered to maintain at least one returns center, whether by directly maintaining the returns center(s) or by associating with a third party that does so.

In step 110, a merchant, service provider, or other party has delivered an item to a customer. In step 111, the customer has decided to return the item, herein referred to as "the return item." A returns label 20 may have already been, or is to be, provided to the customer. For example, the return label 20 is delivered as an enclosure with the customer's original order, such as by being part of the customer invoice or a separate insert.

In other embodiments, the return label 20 could be downloaded from a data network and printed by the customer, or otherwise delivered to the customer by means other than being included with the merchandise delivery. For example, the return label may be separately mailed or sent by facsimile. As another example, the customer might access a website provided by the merchant, link to a returns page, and download the data for printing the return label.

The return label 20 is "pre-authorized" in the sense that the customer not need seek authorization from the merchant. The customer is apprised by the merchant that returns are pre-authorized, such as by information on the invoice or other shipping documents. The notification may be explicit on the return label or elsewhere or may be implicit. The customer may be further apprised that the customer need not pay shipping charges, such as by a "no postage necessary" printing on the return label 20.

The customer may affix the returns label 20 to the packaging for the return item and deliver over the return item to a carrier without paying any shipping charges to the carrier. The customer not need to affix any address markings, make payments, or present indicia of postage, or go through any other shipping process as the return label may accurately represent the necessary information. The returns label may further indicate that delivery charges are to be paid by a recipient. The returns label 20 further identifies the transaction leading to the return. In one embodiment, this is a purchase transaction and the identification is by invoice number or other indicia of the package or its contents. In other embodiments, the transaction could be a warranty claim, repair request, or bulk shipment from a service provider, retailer, or other party.

In step 112, the carrier delivers the return item to the returns provider. As stated above, in the embodiment of FIG. 1, the initial point of return for the package is a standard or specialized returns center, which may receive returns for more than one merchant. The returns center may be regional for a large area such as the United States. In other words, a large geographic area may have a number of returns centers. At the time the data for each returns label 20 is composed, the destination address on the label 20 is determined based on the available returns centers.

In step 114, the returns provider receives the package from the carrier. The returns provider may scan the return label on the package and weigh the package. Any special shipping flags or indicia are entered at this time. For example, the indicia may indicate that an included electronic device may have CPI. In one embodiment, the process of FIG. 8 may be implemented when electronic devices are received.

The electronic devices may be scanned for CPI and if present may be physically and/or electronically quarantined. The electronic devices may also be quarantined if not properly configured or reset to pre-set criteria or standards. For example, the electronic device or associated package may be marked with a quarantine label and an electronic quarantine information associated with an identifier of the electronic device and/or associated package. Although, not show, the electronic devices may be sent to a quarantine area for removal of the CPI utilizing a CPI device. In one embodiment, individual electronic devices or batches of devices may be rejected or prevented from being received individually or collectively. In particular, the WMS 102 and return system 104 may prevent the device from being entered in the system while CPI is present. In this manner, the returns provider receives multiple packages, which may be items originating from multiple merchants or customers, throughout a daily course of business.

In a process known as manifesting, the returns provider calculates the shipping charges due to the carrier and electronically manifests the carrier. In one embodiment, this is done on a daily basis. In the example of this description, the returns provider pays the carrier, and is compensated by the merchant for carrier costs and other services.

The returns provider may then sort the packages by merchant, again using data printed on return label 20 or another indicia affixed by the returns provides, and collects the packages associated with each merchant. The final destination code is encoded on the return label, and may also be printed in human readable form. For large volume merchants, the destination code may be associated with a package chute and/or a docking door.

The returns provider may also provide "value added" services for the benefit of the merchant, such as notification of the return to merchant or notification to the customer of receipt of the package. For example, the returns provider may use the scanned return label information to notify the customer and/or the merchant that the package has been received and whether or not the electronic device was received with CPI. This information may be particularly useful to a service provider that has previously paid a third party or has itself processed a device to remove CPI. In one embodiment, the WMS 102 may document the location and type of the CPI as well as uploading a memory map that proves CPI was present for additional analysis or comparison as needed.

Value added services may include repairing, refurbishing, updating, recycling, or otherwise processing the electronic devices and the associated steps, such that they are suitable for further disposition including return, resale, standard usage, and so forth. After the value added services have been performed, the electronic devices may be systematically or randomly analyzed for CPI.

In step 116, after aggregating the packages for each merchant, the returns provider further ships them in accordance with whatever policies are specified for that merchant. For example, the returns provider may palletize shipments back to the merchant. The return label data is used to create a bill of lading, with data such as pallet counts, package counts, and shipment weight. In addition, electronic devices may be shipped back individually to other returns centers, vendors, liquidators, customers, stores, or other parties. In one embodiment, the policies are implemented electronically by the WMS 102.

Figure 8:
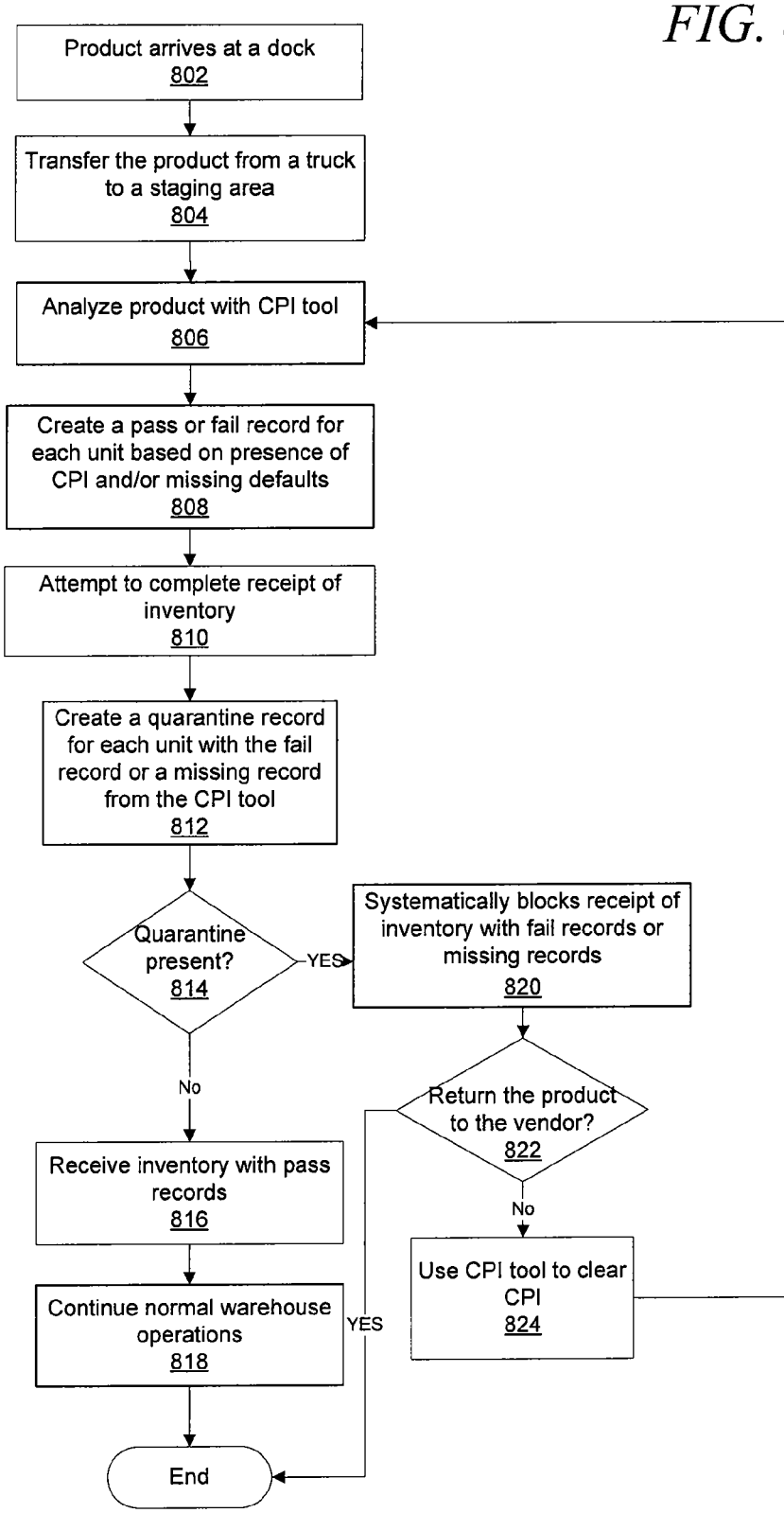
FIG. 8 is a flowchart of a process for processing a device for CPI in accordance with an illustrative embodiment.
Figure 9:
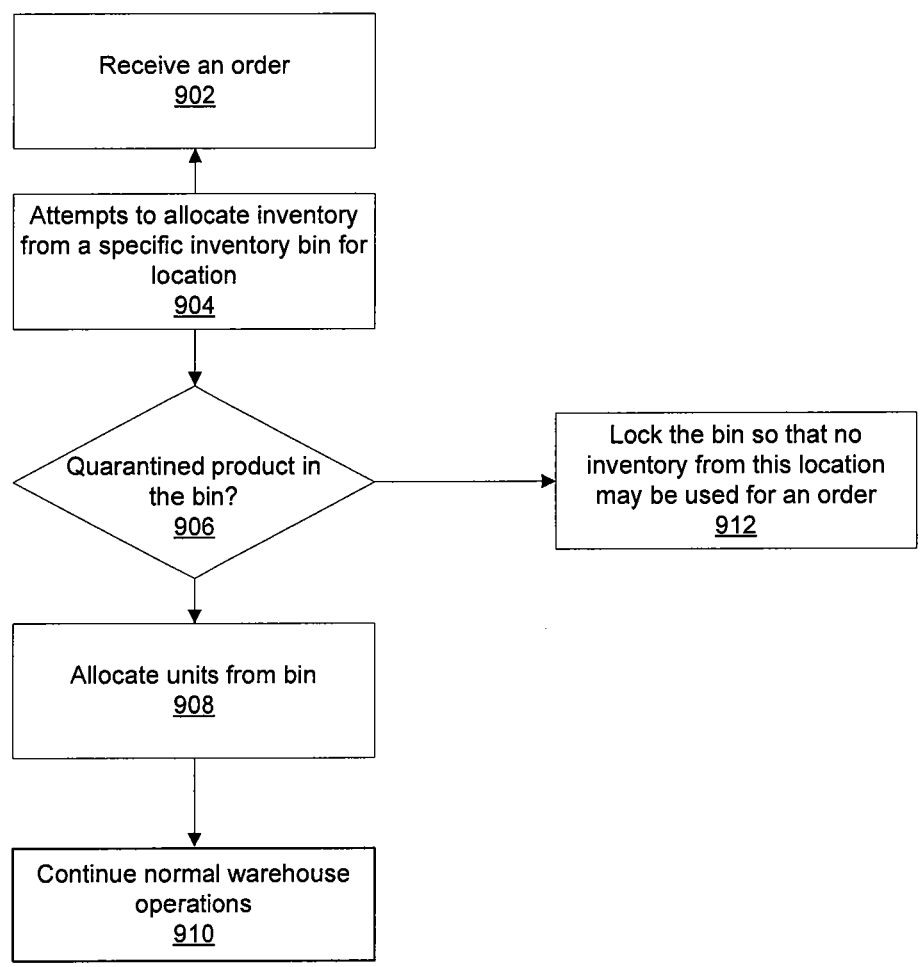
FIG. 9 is a flowchart of a process for allocating units in accordance with an illustrative embodiment.

Before an order may be fulfilled or the return label may be printed, a final CPI verification may be required as further illustrated in FIGS. 8 and 9. In step 118, the package is handled according to the disposition policy or rules of the merchant, such as by being returned to stock, sent to a re-seller, liquidator, or otherwise disposed.

Figure 2:
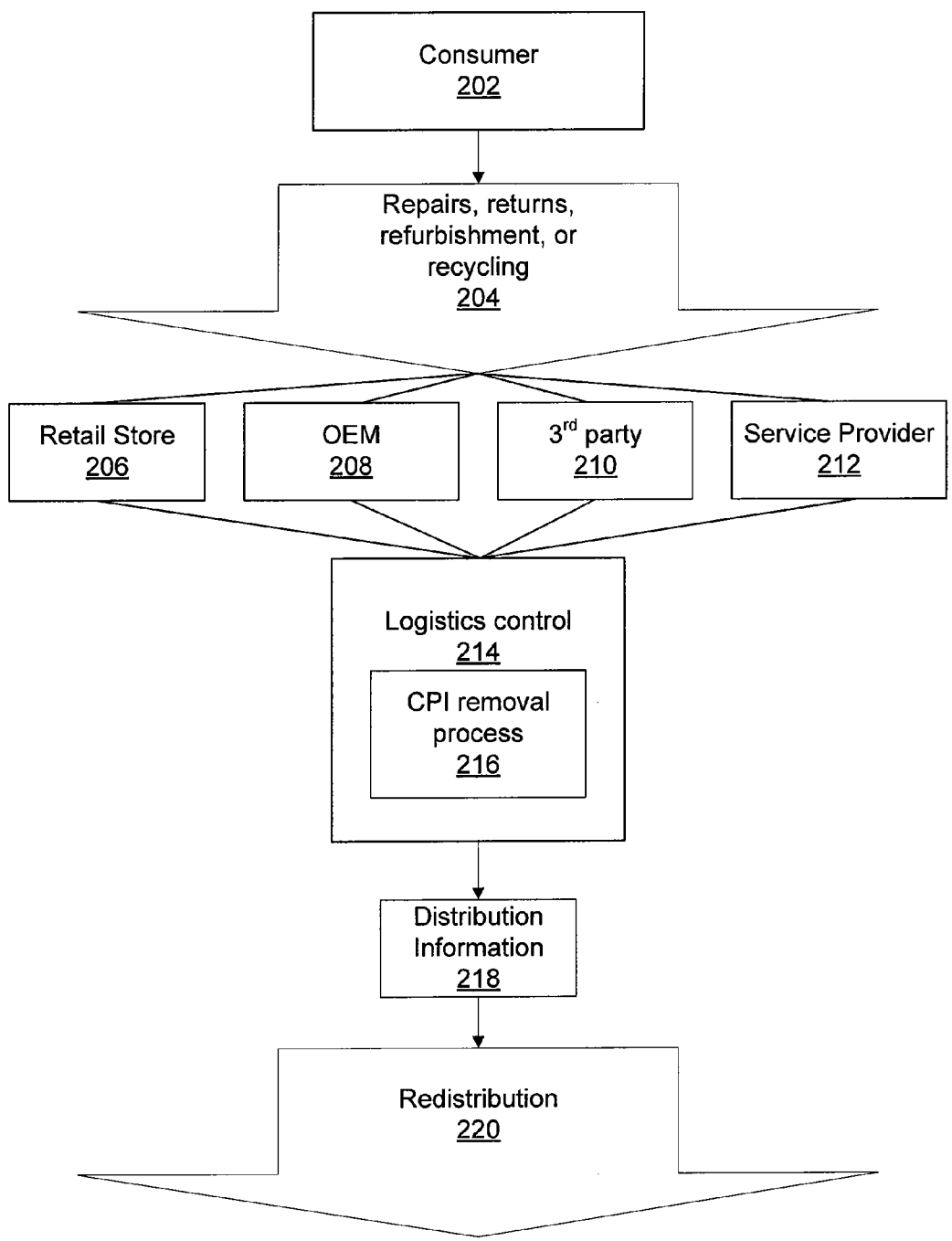
FIG. 2 is a flow diagram of a process flow for processing electronic devices to remove CPI in accordance with an illustrative embodiment.

FIG. 2 is a flow diagram of a process flow 200 for processing electronic devices to remove customer private information in accordance with an illustrative embodiment. The process flow 200 illustrates one embodiment of electronic devices being managed and processed for subsequent redistribution. The process flow 200 may include any number of users, participants, steps, and systems that may be automated or implemented based on user input.

In one embodiment, a consumer 202 returns one or more electronic devices. The consumer 202 may physically present the electronic device, ship the device or connect the device to a portal or an interface managed by a service provider. In one embodiment, the electronic device is presented or supplied for repairs, returns, order fulfillment, refurbishment, or recycling 204. In addition, the electronic device may be received for any number of other purposes not specifically described such as upgrades, reconfiguration or user transfer.

The parties that may communicate or interact with the consumer 202 to receive the electronic device or devices for repairs, returns, order fulfillment, refurbishment, or recycling 204 may include a retail store 206, an OEM 208, a third party 210 and a service provider 212 (collectively, the "parties" 213). The retail store 206, OEM 208, third party 210 and service provider 212 represent a few of many possible parties, organizations, groups or individuals that may receive the electronic devices. The parties 213 may physically or electronically present electronic devices to a logistics control 214.

In one embodiment, the logistics control 214 is a warehouse management facility or operation that is operable to process electronic devices for repairs, returns, refurbishment or recycling 204. The logistics control 214 may have legal or contractual obligations or agreements with the parties 213 to process the electronic devices. The logistics control 214 may also be utilized when the parties 213 need to process an electronic device in a way which is incompatible with their business model, technical skills, or day-to-day operations.

The logistics control 214 may include any number of systems, equipment, and devices configured to detect and remove CPI. In one embodiment, the logistics control 214 may implement a CPI removal process 216 in order to clear the CPI from electronic devices for subsequent reuse and/or redistribution. For example, a number of users may connect electronic devices to a test stand to detect and remove CPI for a service provider and perform necessary tests. The test stand may also reconfigure each electronic device with settings, parameters, software, graphics, and other content. The CPI removal process 216 implemented by the logistics control 214 is further described in terms of systems, devices, interfaces, and methods described herein, such as in FIGS. 3-6.

The CPI removal process 216 may track and record all information relevant to the removal of CPI information from the electronic devices for subsequent access or reporting performed by the logistics control 214 or the parties 213. In one embodiment, the CPI removal process 216 includes a portal and database storing the CPI-related information for retrieval by the logistics control 214 and the parties 213. The logistics control 214 may include any number of different facilities or systems that may operate independently or may be networked. As a result, the CPI removal process 216 may communicate with any number of other logistical control centers and CPI removal systems and processes to perform tracking, reporting, auditing, and verification.

If or once electronic devices are satisfactorily cleared of all CPI and configured, distribution information may be utilized as part of redistribution 220. Redistribution 220 may include returning the individual electronic devices to the respective parties 213 or the consumer 202, sending the electronic devices according to the distribution information 218, or otherwise shipping or processing the electronic devices.

In one embodiment, in which the CPI removal process 216 is performed remotely from the facility or systems of the consumer 202 or the parties 213, redistribution 220 may entail returning control to the applicable parties or activating or authorizing the electronic devices to function normally (i.e. pre-established default settings, parameters, OS versions, and applications). For example, once the logistics control 214 begins implementing management of the electronic devices, all other functionality may be locked out for the electronic devices (with the exception of failsafe or failover operations).

FIG. 3 is a block diagram of a system 300 for merging customer private information in accordance with an illustrative embodiment. The system 300 is one embodiment of a device, networked computing system, or environment in which CPI may be detected, removed and reported.

In one embodiment, the system 300 may include a CPI device 301 or system. The CPI device 302 may be utilized to detect and remove CPI information. In one embodiment, the CPI device 301 may include management logic 302, an interface 304, a graphical user interface 306, libraries and models 308 including libraries for Nokia 310, Samsung 312, Motorola 314, Blackberry 316, E-devices 318, interface commands and scripts 320, a directory structure 322 and a baseline memory map 324. The CPI device 301 may further communicate with a network 326. The network 326 may communicate with a developer website 328. The system 300 may be utilized to test electronic devices 330-336.

In one embodiment, the CPI device 301 is a personal computing device, such as a desktop computer configured to communicate with one or more electronic devices 330-336 concurrently or simultaneously. In another embodiment, the CPI device 301 may be a server or other network device that acts as a master WMS and is accessible to any number of remote computing devices or terminals to perform the methods herein described. The CPI device 301 may include any number of computing or communications elements not specifically described herein including, but not limited to, motherboards, busses, ports, cards, interfaces, adapters, peripherals, displays, jacks, processors, memories, operating systems, applications, modules or similar hardware or software components. The CPI device 301 may include WMS hardware, software, equipment and interfaces in addition to the described elements.

In one embodiment, the management logic 302 is the logic that implements the CPI recording and removal. The management logic 302 may include one or more processors and memories configured to execute commands, instructions, or codes to perform the CPI management. In another embodiment, the management logic 302 may be core software executive or a software module that controls the other functions of the CPI device 301. The management logic 302 may also utilize the libraries 308, interface commands and scripts 320, directory structure 322, and baseline memory map 324 to update the configuration of each electronic device including branding, software, versions, default content, settings, parameters, functionality, and other stored information including internally or externally connected memories (i.e. memory cards).

The processor of the management logic 302 is circuitry or logic enabled to control execution of a set of instructions. The processor may be microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor may be a single chip or integrated with other computing or communications elements.

The memory of the management logic 302 is a hardware element, device, or recording media configured to store data for subsequent retrieval or access at a later time. The memory may be static or dynamic memory. The memory may include a hard disk, random access memory, cache, removable media drive, mass storage, or configuration suitable as storage for data, instructions, and information. In one embodiment, the memory and processor may be integrated. The memory may use any type of volatile or non-volatile storage techniques and mediums.

The management logic 302 may be operable operate automatically or autonomously with or without user input in multiple instances and with multiple display outputs (i.e., screens, views, windows, etc). In another embodiment, the management logic 302 may require user interactions to connect the electronic devices 330-336 and provide user input.

The interface 304 is an input/output system for interacting with the user audibly, visually, and/or tactilely. The interface 304 may include a keyboard, monitor, mouse, voice control system, touch pad, track ball, or other systems or devices for interacting with a user. In one embodiment, the graphical user interface 306 provides a visual interface for interacting with the user. One embodiment of the graphical user interface 306 is illustrated in FIG. 6. The graphical user interface 306 may display information regarding the connected electronic device 330-336, ongoing CPI removal, reports, updates, and other information.

The network 326 is a network operable to communicate data, packets, voice signals, and other electronic communications. The network 326 may represent any number of public or private networks. In one embodiment, the network 326 is an Ethernet network. The network 326 may be utilized to communicate with developer website 328, OEMs, service providers, and other parties to communicate CPI removal reports, problems, libraries, scripts, memory maps, and other electronic communications or resources utilized by the CPI device 301.

The libraries 308 include the electronic information, models, data, scripts, logic, processor, and programs for detecting and removing CPI and configuring or reconfiguring the electronic device 330-336. The libraries 308 may include open source or proprietary information and databases. The libraries 308 may store information for any number of device, models and configurations. Examples of libraries for Nokia 310, Samsung 312, Motorola 314, Blackberry 316, and E-devices 318 are shown. In one embodiment, the libraries 308 may include information designating a baseline memory map and locations in memories of various makes and models that need to be overwritten, searched, or deleted to completely remove the CPI. The various manufacturers, service providers or others may provide scripts, programs, or modules configured to detect and/or delete CPI. Likewise, the libraries 308 may store and update firmware, operating systems, applications, and other versions that are installed on the electronic devices 330-336 before, during, or after the CPI removal process. For example, the baseline memory map 324 may also be uploaded or re-written to the electronic devices 330-336 to update operating systems, applications, default images, video, and files, and to otherwise configure the electronic device 330-336.

In one embodiment, the libraries 308 may include applications that are temporarily installed on the electronic devices 330-336 in order to detect or detect and remove CPI. For example, for electronic device 334, a Java application may be required to be temporarily installed to interface with the phone. Temporary applications may be required when there is a limited API or the applicable electronic device grants limited privileges to outside systems or devices. The temporary application may perform the detection and/or removal. Once the temporary application within the libraries 308 has ensured the CPI is removed, the temporary application may be deleted or otherwise uninstalled by the CPI device 301 or from the electronic device. The CPI device 301 may also verify that the temporary application has been removed.

In one embodiment, content within the libraries 308 may include the interface commands and scripts 320, the directory structure 322, and the baseline memory map 324. The commands and scripts 320 provides data, commands, and information, such as how to perform a query, enabling the CPI device 301 to interface with specified electronic devices.

The directory structure 322 provides details regarding the likely or possible locations of CPI within specified electronic devices. The baseline memory map 324 may provide a template of what a baseline, cleaned, or default memory map of an electronic device should be (or how the electronic device should be configured) for comparison with a real-time memory map of a tested electronic device to identify and remove CPI. The baseline memory map 324 may also identify the types of memory utilized by the electronic device, such as flash memory and a hard drive. In one embodiment, the baseline memory map 324 may also store a scan or electronic imaging of the electronic device 334 before CPI removal for comparison with another baseline memory map 324 or imaging of the electronic device performed after an attempt to remove the CPI was performed. The electronic image or other form of memory map of the electronic devices 330-336 may be stored in the CPI device 301 for access by the remote device 330 or other devices, systems or parties. For example, a retailer may access the electronic imaging performed for the electronic device 334 to ensure that CPI was properly removed when servicing the electronic device 334 or addressing a customer issue.

The CPI device 301 may include any number of ports, jacks, interfaces, hubs, or electronic interfaces (with or without built-in cords) for physically or wirelessly connecting the electronic devices 330-336 to the CPI device 301. In one embodiment, testing may be initiated automatically by the management logic 302 in response to connecting the electronic device 334 to the CPI device 301. The CPI device 301 automatically determines the manufacturer, model, variant, and software version for the electronic devices 330-336. The CPI device locates and determines CPI, such as data, pictures, contacts, menu items, called log entries, user applications, and so forth, that do not conform with a desired state for that electronic device. The desired state may be referred to as the baseline memory map 324 or baseline profile model without CPI. In one embodiment, if the CPI device 301 does not recognize the electronic device 323, the graphical user interface 306 may prompt the user to enter a model for the electronic device. If no model exists, the CPI device 301 may prompt the user to enter information or retrieve information for determining the desired state and for configuring the CPI device to test the electronic device 324 (or similar devices) for future testing. For example, the user may be prompted to enter a time/date, serial number, identifiers, and state of the device when tested.

The electronic devices 330-336 represent the devices under test. Any combination of the electronic devices 330-336 may be tested simultaneously, sequentially, or concurrently. For example, eight netbook models with a single configuration may be tested simultaneously by the CPI device 301. In another example, a test for electronic device 330 may be initiated and may continue to run while tests are initiated and executed for electronic devices 332 and 334 allowing each of the tests to be implemented separately and run at the same time. In one embodiment, the CPI device 301 may include multiple partitions that are accessible to store and test distinct device types and configurations that may have hardware or software conflicts.

Each of the electronic devices 330-336 may require different testing. Testing may involve comparing a desired state (such as a model with all CPI removed) with a state determined for a model of an electronic device under test and variations and baseline characteristics of that electronic device. The electronic devices 330-336 may also be configured to a default or specified state are part of the CPI removal process.

In another embodiment, the system 300 may include a remote device 330 locally or remotely executing a desktop application 332. The remote device 330 may be operated by one or more remote users to perform the functions and operations of the CPI device 301. In one embodiment, the CPI device 301 is a networked device that includes or manages a database including the libraries 308. The CPI device 301 may be accessible by the remote device to clear CPI off of devices that are connected to the remote device 330. The desktop application 332 may include the desktop application 332 for clearing the CPI as described for the CPI device. The desktop application 332 may be locally stored and installed, a web interface, or a network application that may be accessible through a server, advanced intelligent network device, or the CPI device 301.

In one embodiment, the remote device 330 may be provided to a communications service provider dealer network, retail stores, or other parties that may need to remove CPI. For example, the operator of the remote device 330 may have a license and operation agreement with the operator of the CPI device 301 to remotely access the CPI device 301 or to perform the features and functionality of the CPI device 301 including potentially proprietary CPI removal applications, libraries, and processes utilized by the management logic 302 and the libraries 308.

In one embodiment, the remote device 330 may access the databases and functions of the CPI device 301 utilizing a SSL connection through the network 326. Other forms of secure communication known to those skilled in the art may alternatively be utilized. The remote device 330 may access information including audit and reporting records for specified devices to determine whether CPI removal has been previously been performed or attempted. As a result, problems, variations, or exceptions may be detected, analyzed, quantified, and documented. The remote device 330 may be granted full access or access on a transaction-by-transaction basis. For example, an operator of the remote device 330 may be required to enter an IMEI that authorizes the remote device 330 to communicate with the CPI device 301. The remote device 330 may be utilized to determine whether a device is authorized and CPI free or whether the device has been compromised.

In one embodiment, the operator of the CPI device 301 may charge retailers, refurbishers, and other parties a fee to lease, acquire, or access the functionality of the CPI device 301, the desktop application 332, the libraries 308 or services available. For example, the retailer may lease the CPI device 301 or the remote device 330 as well as paying for service fees or update costs associated with updates to the desktop application 332 and/or the libraries 308.

The processes of the illustrative embodiments may be stored as a set of rules or policies that are electronically and/or manually implemented to govern processing of electronic devices. In one embodiment, the rules may be utilized by a processing system, such as a warehouse management system, to ensure that electronic devices found to contain CPI are properly quarantined until the CPI is verifiably removed. Verifiably removed indicates that a removal or flashing process has been implemented with the electronic device being tested, scanned, or analyzed afterwards to ensure that the CPI is no longer present on the electronic device. In one embodiment, the verification may be performed by comparing a memory map before and after (or with a baseline memory map) to ensure identified CPI was removed. Processing of the electronic devices may be performed utilizing bar codes or other machine readable information integrated with, attached to, or associated with each electronic device.

Figure 4:
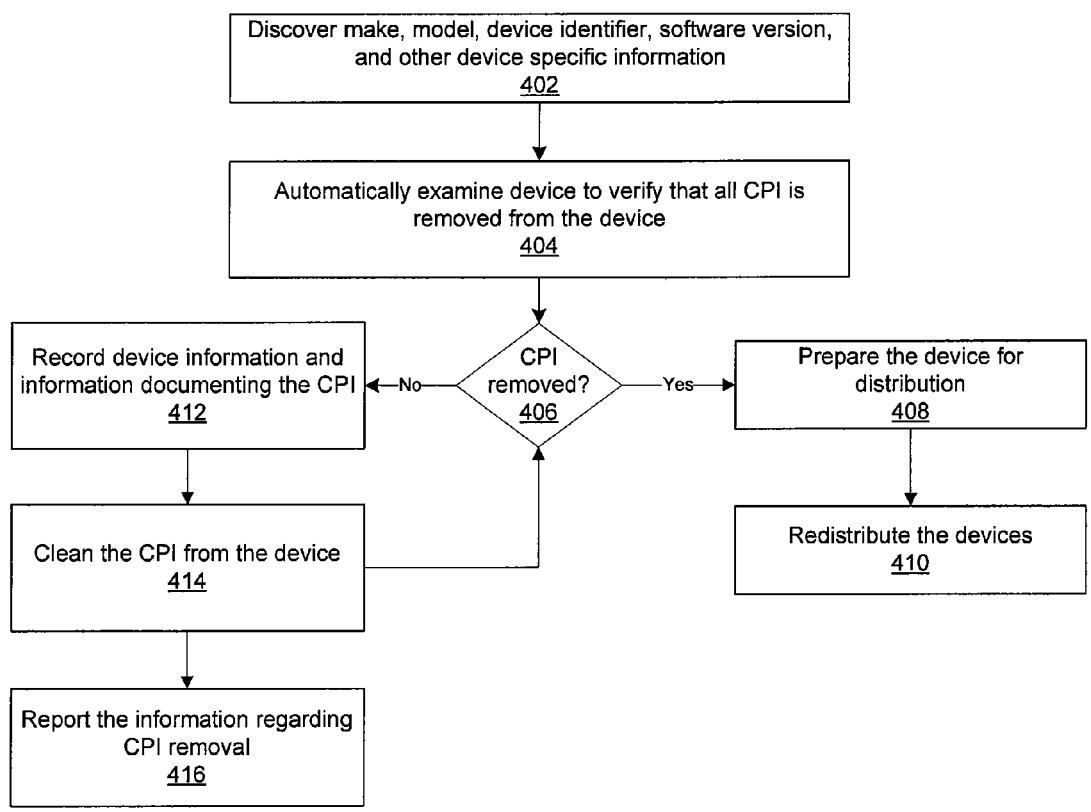
FIG. 4 is a flowchart of a process for determining the presence of CPI on an electronic device in accordance with an illustrative embodiment.

FIG. 4 is a flowchart of a process for determining the presence of customer private information on an electronic device in accordance with an illustrative embodiment. The process of FIG. 4 may be implemented by a CPI device with or without user interaction. In one embodiment before the process of FIG. 4 may be implemented one or more electronic devices are electrically connected to the CPI device. For example, a micro-USB connector may be connected to the electronic devices being analyzed, updated, reconfigured, and cleared. In another embodiment, the electronic device may be connected to the CPI device for reconfiguration through a wireless connection, which may include GSM, Bluetooth, WiFi, WiMAX, future equivalents, or other similar connections. The process of FIG. 4 is utilized to test one or more electronic devices by performing statistical monitoring, state recognition, notification or recording of determined states, recognizing the broadest possible range of devices by model and variant, and automating the assessment and actions based in the various determinations.

The process may begin by discovering a make, model, device identifier, software version, and other device specific information (step 402). During step 402, the CPI device may scan and analyze the type and configuration of the device. The device identifier may include determining a make, model, International mobile equipment identity (IMEI), IP address, software version, phone number, subscriber identity module (SIM) card, or other hardware or software that identifies the electronic device.

Next, the CPI device automatically examines the device to verify that all CPI is removed from the device (step 404). The determination of step 404 may be performed before or after other manual or automatic steps have been taken to remove CPI. The CPI device may scan or retrieve data from specific areas of memory to determine whether there is CPI on the device. In one embodiment, the CPI device may perform the determination based on information retrieved during step 402. For example, particular makes and models of devices may have specified locations for storing CPI. The CPI device may utilized particular circuits, logic, scripts, or algorithms to perform step 404 based on the information determined during step 402. During step 404, the current state of the device may be compared against a desired state for the device. The current state may include a real-time memory scan.

Next, the CPI device determines whether the CPI is removed (406). If the CPI device determines the CPI is removed, the CPI device prepares the device for distribution (step 408). Preparing the device may include updating operating systems, settings, content, functionality, applications, and other software for the device. Similarly, the device may be given a complete or partial systems check, re-branding, reconfiguration, and re-packaged (with or without relevant accessories, manuals, and other necessary items) for distribution.

Next, the device is redistributed (410). Redistribution may include reselling, returning, shipping, or otherwise returning the device to the relevant party.

In response to determining the CPI is not removed in step 406, the CPI device records the device information and information documenting the CPI (step 412). The CPI device may record the date and time, the specific type of CPI found and secure documentation of the CPI, the location of the CPI on the electronic device, a party that initially performed or attempted CPI removal, and other information and metadata related to the device or attempted removal of the CPI.

Next, the CPI device cleans the CPI from the device (step 414). The CPI may be removed by overwriting appropriate selections, deleting or clearing specific or general portions of memory, utilizing built-in removal codes, scripts, or processes. The CPI may be removed automatically or based on actions of a user, operator, or technician (generically referred to as a user). In one embodiment, a module of the CPI device may remove the CPI from the electronic device utilizing a module and library defining locations of CPI for that specific electronic device.

Next, the CPI device reports the information regarding CPI removal (step 416). The information of step 412 may be utilized to generate a report and audit trail. The information may be stored in a database, web-portal, record, or other memory element. The records may be tracked for particular service providers, retailers, OEMs, or other parties as well as by particular devices, models, or fields of tracked information. As a result, it may be possible to determine whether there is frequently difficulty or troublesome to remove CPI from specific device types. As a result, the CPI device or removal process may be reconfigured to more effectively remove CPI for future devices. Step 412 may also involve sending one or more electronic messages including metadata to specified parties documenting the CPI. For example, service providers, CPI removal parties, managers, and others may be sent an email or report for every violation, daily, or weekly.

Figure 5:
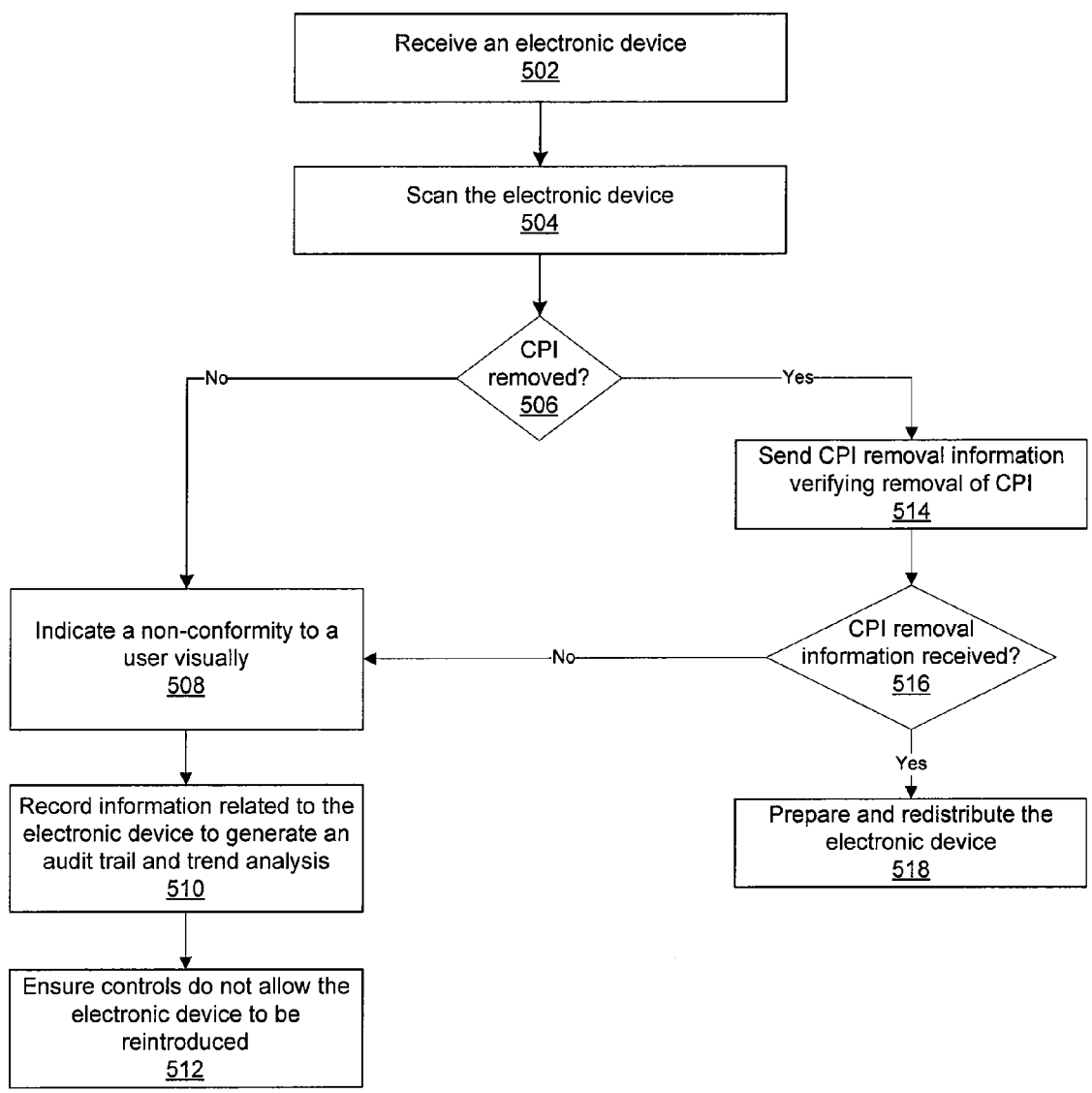
FIG. 5 is a flowchart of a process for verifying removal of CPI from an electronic device in accordance with an illustrative embodiment.

FIG. 5 is a flowchart of a process for verifying removal of customer private information from an electronic device in accordance with an illustrative embodiment. The process of FIG. 5 may be integrated with the process of FIGS. 1 and 4 or may be implemented as an independent process. The process of FIG. 5 may be implemented as a gatekeeping point during any part of a merchandising process for detecting CPI and reporting the CPI to specified parties.

The process may begin by receiving an electronic device (step 502). An adapter, interface or ports may be utilized to wirelessly or physically connect the CPI device to the device through a proprietary or standard connection.

Next, the CPI device scans the electronic device (step 504). The scan determines the state of the electronic device and CPI stored or accessible through the device. The CPI device determines whether the CPI is removed (step 506). For example, the current state of the electronic devices is compared to a desired state utilizing memory maps.

If the CPI is determined to still be present on the electronic device, the CPI device indicates a non-conformity to a user visually (step 508). In one embodiment, an alert may be presented to a user indicating the non-conformity/failure to the user. The alert may be utilized to implement additional manual or automatic processes for the electronic device, such as a complete memory wipe and reinstallation of an operating system and applicable applications.

Next, the CPI device records information related to the electronic device to generate and audit trail and trend analysis (step 510). The audit trail and trend analysis may be utilized to more effectively remove CPI from electronic devices in the future and to indicate potential issues. In some cases, the audit trail may be required to document business practices, compliance with rules and logic, to ensure compliance with laws and business policies.

Next, the CPI device ensures controls do not allow the electronic device to be reintroduced (step 512). The controls may include printing up a "CPI FAILURE" sticker or quarantine label for the electronic device or storing a message in the electronic device itself indicating that all CPI is not removed. For example, a user may be required to physically scan the device to remove CPI that is unable to be removed through the automated process.

If the CPI is determined to have been removed in step 506, the CPI device sends CPI removal information verifying removal of CPI (step 514). The CPI removal information may be sent to designated parties, saved in a database, or otherwise communicated to specified parties.

Next, the CPI device determines whether the CPI removal information is received (step 516). In one embodiment, an electronic confirmation or indication may be required to acknowledge that the CPI removal information is received by an application, system, device, equipment, or user. If the CPI removal information is not received, the CPI device indicates a non-conformity to a user visually (step 508). The non-receipt of the CPI removal information may require correcting and documentation before the electronic device may be subsequently redistributed.

If the CPI removal information has been received in step 516, the electronic device is prepared and redistributed (step 518). The electronic device may be updated with the most current software, applications, settings, branding, and repackaged and redistributed through the proper channels and with the appropriate documentation indicating that all CPI has been removed and if necessary re-verified with a memory map or other information stored.

FIG. 6 is a flowchart of a process for auditing electronic devices for CPI during processing in accordance with an illustrative embodiment. The process of FIG. 6 may be implemented by one or more of a warehouse management system 602, a CPI removal system 604, and a flashing system 606. In one embodiment, one or more of the warehouse management system 602, the CPI removal system 604, and the flashing system 606 (generically referred to as the "WMS" 602) may be integrated in a device, system, or networked implementation as herein described or in the incorporated reference. The WMS 602 may be utilized as an automatic tool to minimize the possibility of introducing an electronic device including CPI to a customer or the stream of commerce based on human error.

In one embodiment, the process of FIG. 6 may be implemented for a warehouse processing or logistics control system or facility. The process of FIG. 6 may be implemented by testing a device to determine whether CPI is present (step 608). The determination of step 608 may be performed numerous times by scanning or analyzing the applicable electronic device. Step 608 may additionally include deleting CPI if detected. In one embodiment, the determination of step 608 may make the determination based on a real-time scanning process as well as evaluating previously recorded information for the electronic device. For example, during step 608, the WMS may determine whether the electronic device has been certified as not containing CPI, whether the electronic device is marked as having failed a test based on information in a record, or whether there is no record.

The electronic device is required to include a field, maker, flag, or indicator that specifies that electronic device has been scanned or examined and found not to include CPI. In one embodiment, the WMS may lock out or prevent the electronic device from being entered into anything other than a quarantine queue if CPI is present. As a result, the problem with the electronic device including CPI cannot be propagated further. Metadata of devices including CPI are recording during step 608 for storage. The metadata may specify information, such as when CPI was found, who found it, how it was found, who had previously processed the device, the type and location of the data found, and all electronic images of the device previously generated and the current electronic image. As a result, after further processing the electronic device may be further analyzed utilizing the electronic device and the recorded metadata. In one embodiment, the metadata is stored in a quarantine table linked with the record for the individual electronic device. The quarantine information of the metadata ensures that the electronic device with CPI cannot be utilized in the allocating and shipping process to fulfill an order or request.

If CPI is detected during step 608, the WMS 602 marks the electronic device as including CPI (step 610). The WMS 602 may set a field or electronic indicator to specify that the electronic device includes CPI. Additionally, the electronic device may be physically marked with a sticker, bagged, and/or physically separated into a quarantine area. The WMS 602 also quarantines the electronic device (step 612). The electronic device may be physically and electronically quarantined. As a result, any attempts to electronically process the device may lock the user out of the system (i.e. an interface may display a quarantine notification and prevent the electronic device from being processed) and require the user to take procedures to again quarantine the device, such as walk it to a quarantine area. Next, the WMS processes the electronic device to remove the CPI (step 614). During step 614, the CPI may be removed or the device may be flashed to ensure removal of the CPI. In addition, the electronic device may be reconfigured to desired settings, operating system, applications, content, and branding.

As shown, the CPI detection process of step 608 may be performed at anytime before or after receiving (step 616), allocating (step 618), or shipping (step 620) the electronic device. In one embodiment, a load of merchandise, such as processed phones may be unable to be electronically accepted with a phone including CPI is included in the batch. As a result, the entire batch may be returned as being compromised, the individual phone may be returned or quarantined, or the electronic device may be further quarantined or separated with a record kept of the detection of the CPI and rejection of the electronic device as being received for processing. In another embodiment, if CPI is detected on a device during an allocating stage, all of the electronic devices that are in the same batch or being processed with the electronic device may be locked down until each is individually tested. In another embodiment, electronic devices may be randomly tested at any time to ensure that the CPI removal process and procedures are being followed and implemented. The audit information may be automatically uploaded, updated, or sent to specified parties, such as a service provider.

FIG. 7 is a pictorial representation of a graphical user interface for removing customer private information from an electronic device in accordance with an illustrative embodiment. The graphical user interface 700 is one embodiment of an interface that may be presented. The graphical user interface may include information that is automatically populated based on the CPI detection and removal process. Additionally, the graphical user interface 700 may allow interaction with a user. In one embodiment, the user may be required to present identification information, such as a username, password, company identification, or other access information to access the graphical user interface and/or control the CPI device.

In one embodiment, the graphical user interface 700 may indicate whether the CPI has been removed or is still present. The graphical user interface 700 may also indicate the electronic device identifier, file locations(s) of CPI, file types, a party the electronic device is received from, date the CPI was cleared, a user in charge or removing the CPI, CPI removal reports sent and received.

The graphical user interface 700 may include any number of views, windows, and access information for initiating, managing, and reviewing the CPI detection and removal from electronic devices. For example, the graphical user interface 700 may be utilized to generate reports or audits for specific electronic devices or for groups of electronic devices (such as lots or batches of electronic devices received).

The graphical user interface 700 may include any number of fields and menus for selecting the electronic devices for testing. The graphical user interface 700 may also present options, look-up features, and input fields for adding new device types (i.e., new makes and models) for updating the logic and libraries utilized to perform testing.

The graphical user interface 700 may also indicate whether the operating system is restored or updated to a newest version, co-branding is established or restored, settings are reconfigured, integrated or external memory devices are cleared and applications are installed or updated.

The systems, devices, and processes as herein described may be mixed, substituted, or combined in any number of embodiments. FIG. 8 is a flowchart of a process for processing a device for CPI in accordance with an illustrative embodiment. The process of FIGS. 8-10 may be implemented by a processing company ("processor" i.e., warehousing company, logistics control facility, etc) utilizing a CPI device, warehouse management system, or other electronic and tracking tools. The process begins with product arriving at a dock (step 802). The product represents a shipment of one or more electronic devices. The product may be received via any number of shipment or delivery processes, such as truck, boat, train, and plane to name a few.

Next, the processor transfers the product from the truck to a staging area (step 804). The processor analyzes the product with a CPI tool (step 806). The processor creates a pass or fail record for each unit based on the presence of CPI and/or missing defaults (step 808). For example, a cell phone that does not include CPI may be marked as passing while another cell phone that does not include CPI, but is missing defaults may be marked as failing. Defaults may include software, such as operating systems and applications, updates or other hardware or software requirements for the unit. Units, such as PDAs, that include CPI are marked with a failing record.

Next, the processor attempts to complete receipt inventory (step 810). The processor also creates a quarantine record for each unit with the fail record or a missing record (step 812). For example, the quarantine record may be assigned by the CPI tool in an independent process or as part of step 808.

Next, the processor determines whether a quarantine is present (step 814). The quarantine may include a physical or electronic quarantine label or identifier associated with the respective unit. If there is not quarantine present, the processor receives the inventory with pass records (step 816). Next, the processor continues normal warehouse operations (step 818). For example, the units may be refurbished, repaired, shipped, and so forth.

If the processor determines the quarantine is present in step 814, the processor systematically blocks receipt of inventory with fail records or missing records (step 820).

Next, the processor determines whether to return the product to the vendor (step 822).

If the processor determines to return the product to the vendor, the process ends with the not being accepted or otherwise returned to the vendor or other party.

If the processor determines not to return the product to the vendor in step 822, the processor uses the CPI tool to clear the CPI (step 824). The product may also be reconfigured and reloaded to a designated software and setting state. The processor may alternatively use a flashing tool or device to clear the CPI before returning to analyze the product with the CPI tool (step 806).

FIG. 9 is a flowchart of a process for allocating units in accordance with an illustrative embodiment. The process of FIG. 9 may begin by receiving an order (step 902). Next, the processor attempts to allocate inventory from a specific inventory bin for allocation (step 904).

Next, the processor determines whether there is quarantined product in the bin (step 906). The quarantined product may be detected by evaluating physical and electronic identifiers, randomly or systematically testing the product in the bin for CPI, or otherwise determining the product is quarantined or should have previously been quarantined.

If there is not quarantined product, the processor allocates units from the bin (step 908) before continuing normal warehouse operations (step 910).

If quarantined product is found in the bin in step 906, the processor locks the bin so that no inventory from this location may be used for an order (step 912). The processes, checkpoints, policies, procedures and systems of the processor may then be evaluated to determine how the product was moved into the bin.

Figure 10:
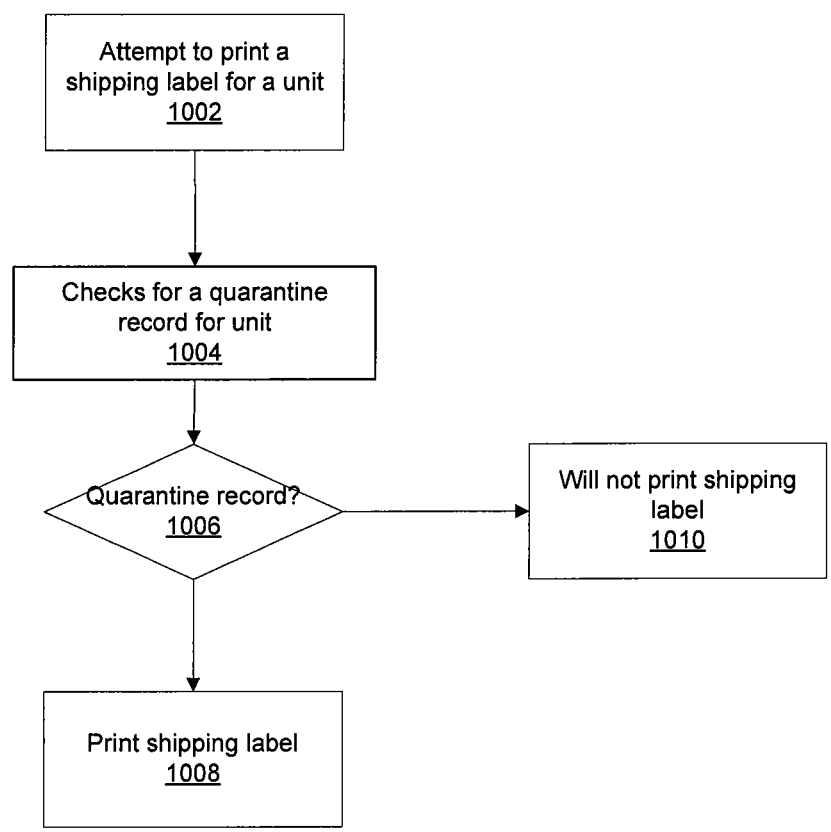
FIG. 10 is a flowchart of a process for shipping a unit in accordance with an illustrative embodiment.

FIG. 10 is a flowchart of a process for shipping a unit in accordance with an illustrative embodiment. The process of FIG. 10 may begin with the processor attempting to print a shipping label for a unit (step 1002).

The processor checks for a quarantine record for the unit (step 1004) as an integrated or separate part of the printing process. The processor then determines whether there is a quarantine record (step 1006). If there is not a quarantine record, the processor prints the shipping label (step 1008). The printing label may be printed from one or more printing devices in communication with the CPI device/WMS.

If the processor determines there is a quarantine record in step 1006, the processor will not print the shipping label (step 1010). In one embodiment, an error or alert message may indicate that the unit must be quarantined may be communicated or displayed to applicable personal. The unit may also be separated and marked as quarantined with additional process and system analysis to determine how the unit reached that location or point in processing.

The illustrative embodiments provide an automated system and method for detecting and removing CPI that is less reliant on user actions. As a result, the likelihood of user error is decreased and efficiency is increased. Similarly, processed electronic devices are less likely to re-enter the stream of commerce with unremoved CPI. Various types of electronic devices may be tested by a user on a single device without extensive user interaction. The CPE removal device may prompt a user that is not an expert in CPI removal to take certain steps and perform certain actions in a specified order until all conditions are met for removal of CPI.

Figure 11:
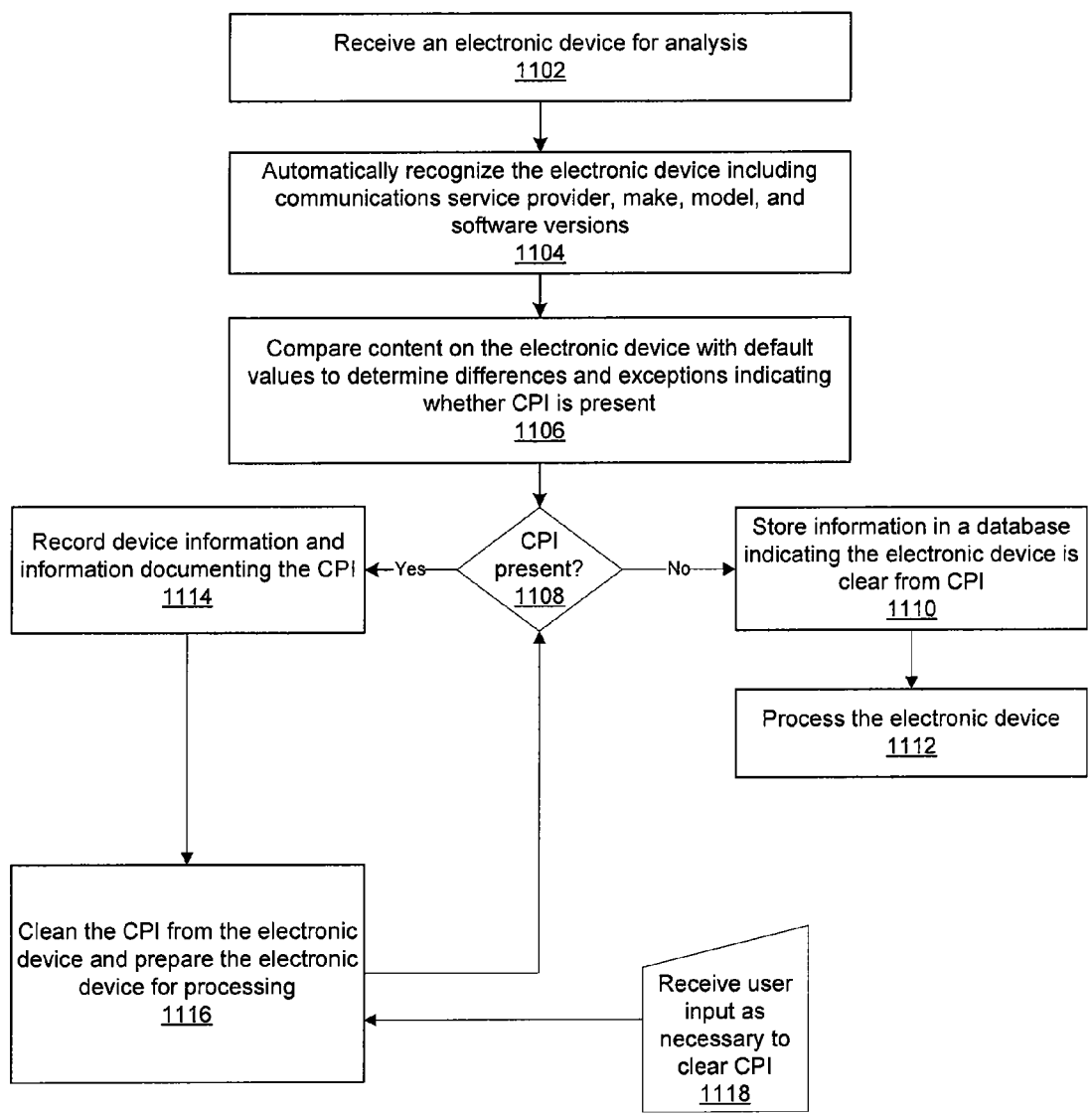
FIG. 11 is a flowchart of another process for removing CPI from a device in accordance with an illustrative embodiment.

FIG. 11 is a flowchart of another process for removing CPI from a device or flashing a device in accordance with an illustrative embodiment. The process of FIG. 11 may be implemented by a test stand, fixture, or computing device configured to electrically interface with an electronic device. The process may begin by receiving an electronic device for analysis (step 1102). The electronic device may be received by electrically connecting the electronic device to the test stand utilizing a cord or wire, or a dedicated wireless connection. For example, the cord may include connectors for interfacing with USB ports and micro USB ports of the test stand and electronic device, respectively. Additionally, a dedicated WiFi, Bluetooth, or other similar wireless connection or link may be established between the electronic device and the test stand. For example, the wireless device may need to be placed in a reconfiguration or paired mode to perform the process of FIG. 11. The wireless connection may be secured ensuring that any CPI is not available to outside parties.

Next, the test stand automatically recognizes the electronic device including a communications service provider, make, model and software, (step 1104). The test stand may utilize retrievable information and executed scripts to determine the information mentioned in step 1104.

Next, the test stand compares content in the electronic device with a default values to determine differences and exceptions indicating whether CPI is present (step 1106). In one embodiment, a database in the test stand or accessible by the test stand may store the default values (i.e. baseline values, memory maps, etc). The test stand may run a scan of all or portions of the memory known to store CPI. The scanned data or information may be required to match a pattern, if the scanned data does not match, the differences or exceptions are determined from the different data.

Next, the test stand determines whether CPI is present (step 1108). If CPI is not present, the test stand stores information in a database indicating the electronic device is clear from CPI (step 1110). Next, the test stand may process the electronic device (step 1112). During step 1112 additional software reconfigurations or updates may be performed.

If the test stand determines CPI is present during step 1108, the test stand records device information documenting the CPI (step 1114). In one embodiment, the location and type of CPI may be stored locally to the test stand or to a database accessible by a number of parties including service providers, manufacturers, and device processors. For example, the CPI information may be stored in XML records in the warehouse management system.

Next, the test stand cleans the CPI from the electronic device and prepares the electronic device for processing (step 1116). In one embodiment, the test stand may execute a master clear function that may remove all or 80% of the CPI. In one embodiment, CPI removal and verification may be run during steps 1108 or 1116. In addition, the electronic device may be flashed, software updated, settings reset, and parameters established during step 1116.

In addition, the test stand may receive user input as necessary to clear the CPI (step 1118). The test stand may provide a list, instructions or prompts for checking for and/or removing CPI files from the electronic device.

Figure 12:
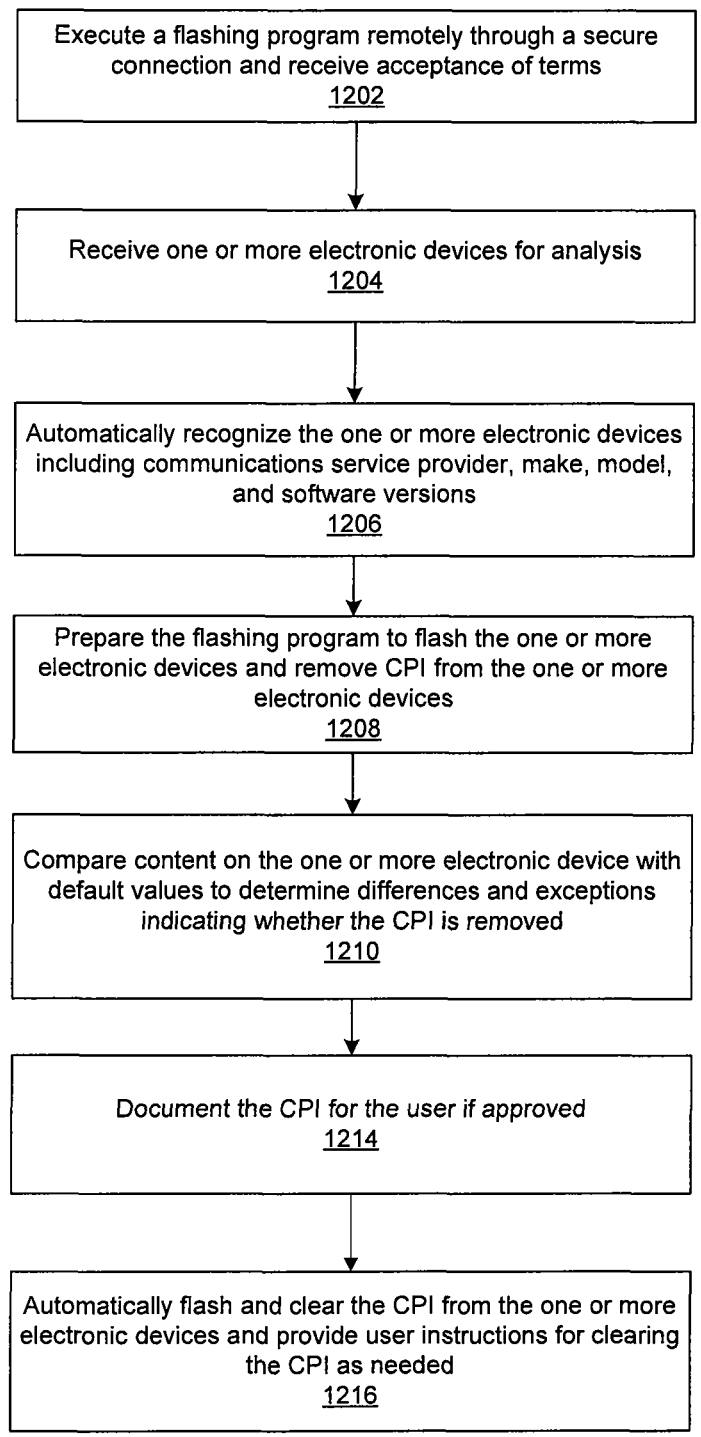
FIG. 12 is a flowchart of a remote process for removing CPI from a device in accordance with an illustrative embodiment.

FIG. 12 is a flowchart of a remote process for flashing a device in accordance with an illustrative embodiment. In one embodiment, the process of FIG. 12 may be implemented by a computing device that is connected to an electronic device wirelessly or through a wired connection. The computing device may remotely communicate with one or more specialized testing devices, such as servers, databases, test stands, cloud or distributed computing systems, or other computing devices. In one embodiment, the computing device may include a heads-up display. The computing device may allow any number of electronic devices to be scanned, analyzed, flashed, and cleared of CPI, sequentially, simultaneously, or concurrently as connected.

The process of FIG. 12 may begin with the computing device executing a flashing program remotely through a secure connection and receiving acceptance of terms (step 1202). In one embodiment, the user may access or download the flashing program which may include a CPI removal program or tool through the internet. For example, a browser of the client device may be utilized in a client/server architecture to flash the device and remove CPI without the need for device specific drivers to the loaded and executed on the computing device. In particular, a consistent, simplified, and intuitive interface may be presented to the user for flashing the device or removing the CPI that is easily understood by non-technical users. As a result, resources of the computing device are maintained while utilizing remotely available devices and expertise to remove CPI or flash the device.

In another embodiment, the flashing program may be temporarily or permanently downloaded. The flashing program may be configured to receive automatic updates (i.e. for each device) and may include any number of applicable drivers or libraries that are program or device specific. The flashing program may utilize a plug-and-play framework for removing CPI once the user approves or proactively selects to remove the CPI. The acceptance of terms may include license or payment terms for flashing each device or removing CPI from each device. For example, payment terms may include a per device fee, daily, monthly, or yearly access fee, one-time payment, or other fee structures.

Next, the computing device receives one or more electronic devices for analysis (step 1204). A user may connect any number of adapters, cords, docking stations, or interfaces to the computing device to provide a connection to the one or more electronic devices. Alternatively, wireless connections may be established with the electronic devices.

Next, the computing device automatically recognizes the one or more electronic devices including communications service provider, make, model, and software versions (step 1206). The flashing program may be configured to flash and remove CPI from distinct makes, models, and software revisions simultaneously Next, the computing device prepares the flashing program to remove CPI from the one or more electronic devices (step 1208). The flashing program may be configured for the electronic devices that are recognized. In some cases, the flashing program may be required to utilize a network connection to retrieve additional instructions, commands, code, libraries, drivers, or other data. In one embodiment, the simplified user interface may load a software controller that hides the complexity of the master flashing program from the user. The software controller interacts with the remotely available CPI/flash systems and tools utilizing low level operating system application program interfaces to read and control the master systems and user interfaces. For example, the software controller may set the location of the device firmware and communications port, display the progress, and read pass/fail status. In one embodiment, the device specific drivers are installed and executed on the remote server preventing driver conflicts on the computing device. Users may then connect to the simplified user interface to remove the CPI or flash the device. The marker flashing program on the server and the application executed by the computing device may interact and communicate to perform the functions and controls.

Next, the computing device compares content on the electronic device with default values to determine differences and exceptions indicating whether the flash is completed (step 1210).

Next, the computing device documents the CPI for the user if approved (step 1214). During step 1214, detected CPI may be documented internally or externally for the user. For example, the location and type of CPI may be recorded while not tracking the actual information included in the CPI to prevent violation of applicable laws, standards, or commercial practices.

Next, the computing device automatically flashes the electronic device, clears the CPI from the one or more electronic devices, and provides user instructions for clearing the CPI as needed (step 1216). During step 1216, the computing device may automatically flash the electronic devices and/or remove as much CPI as possible after which the CPI removal program may prompt the user to remove the CPI. The CPI clearing process includes verifying or ensuring that the electronic device is properly updated to a desired state and reconfigured based on instructions from an associated party, such as a service provider.

In one embodiment, the process of FIG. 12 may be implemented as a flashing program for one or more electronic devices or as a CPI removal program. In another embodiment, both flashing and CPI removal may be performed and verified.

Figure 13:
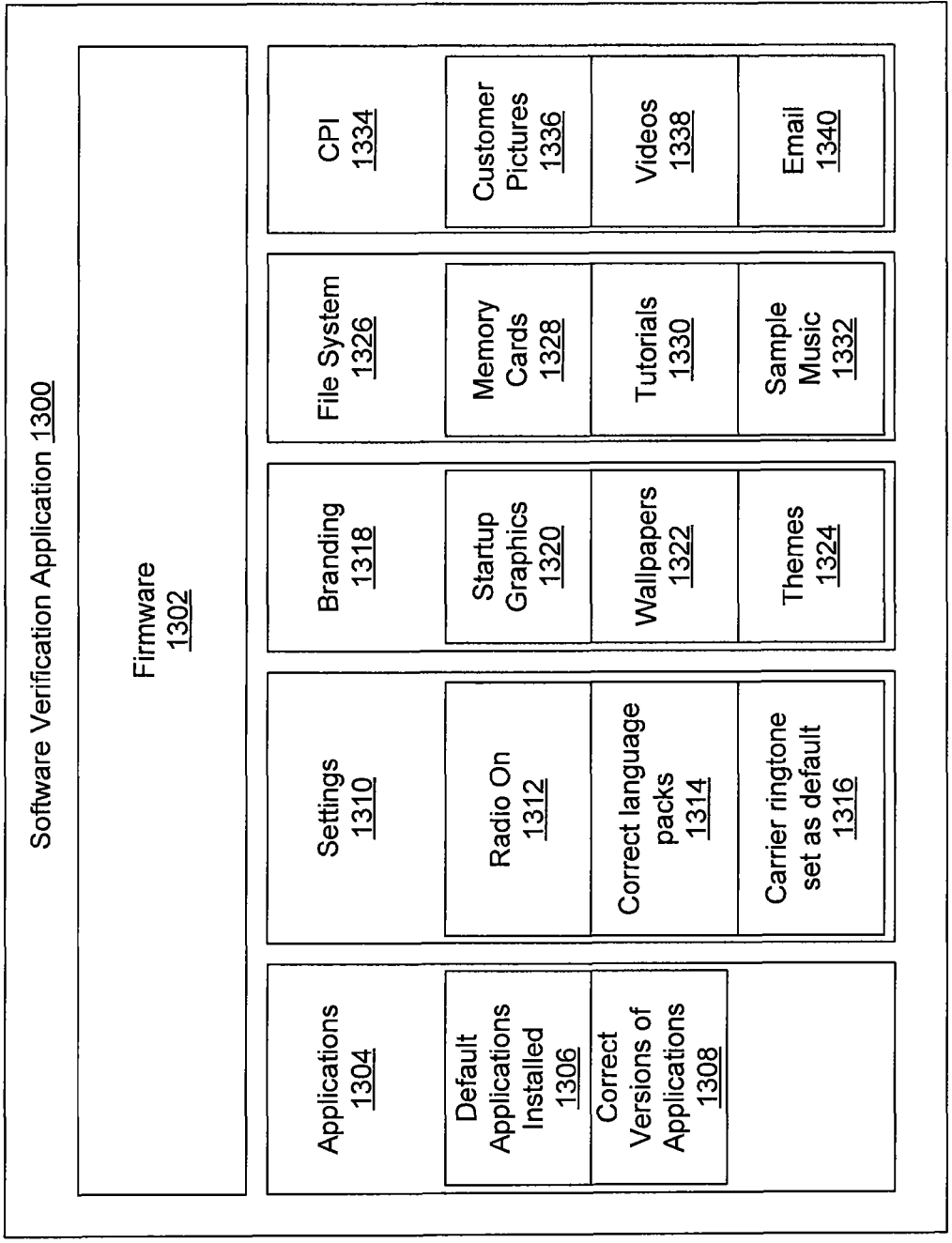
FIG. 13 is a pictorial representation of an application for software verification in accordance with an illustrative embodiment.

FIG. 13 is a pictorial representation of a software verification application 1300 in accordance with an illustrative embodiment. The software verification application 1300 may be executed and utilized by any of the previously described devices. In addition, the software verification application 1300 may be bundled with any of the other programs, applications, or instructions herein disclosed.

The software verification application 1300 may be executed by a computing device (i.e. including a process, memory, database, etc), such as a server or electronic device utilizing a processing unit. The computing device may include an interface for communicating with one or more electronic devices, such as mobile phones sequentially, simultaneously, or concurrently. For example, the interfaces may include USB ports and wired connections or connectors, wireless transceivers (i.e. WiFi, Bluetooth), or other communications mediums for connecting the one or more electronic devices to the computing device. Tests on multiple devices may be implemented simultaneously, concurrently, sequentially, or in parallel.

In one embodiment, the software verification application verifies the electronic resources of the tested units or devices. For example, the firmware 1302 represents the firmware and software utilized by an electronic device. The firmware and software may include operating systems, applications, settings, configurations, branding, marketing, and advertising content, and other software.

The software verification application 1300 may be utilized to verify the firmware 1302, applications 1304, settings 1310, branding 1318, file system 1326, and CPI 1334. In addition, the software verification application 1300 may verify default content (not shown) for an electronic device that may not be otherwise categorized. The applications 1304 may include default applications installed 1306, correct versions of applications, user preferences, or application usage information. The settings 1310 may include radio settings 1312, correct language packs 1314, and carrier ringtone set as default. The branding 1318 may include startup graphics, wallpapers 1322, and themes 1324. The file system may include memory cards 1328, tutorials, 1330, and sample music 1332. For example, the sample music 1332 is indicative of any sample files, such as music, pictures, videos, or so forth. The CPI may include customer pictures 1336, videos 1338, and email 1340. The email 1340 may be indicative of any electronic message, such as chat messages, tweets, texts, picture messages, video messages, emails, audio messages, or so forth. The software verification application 1300 may also verify and clear any number of file systems, memories, caches, databases or other components that vary from the referenced unit.

Figure 14:
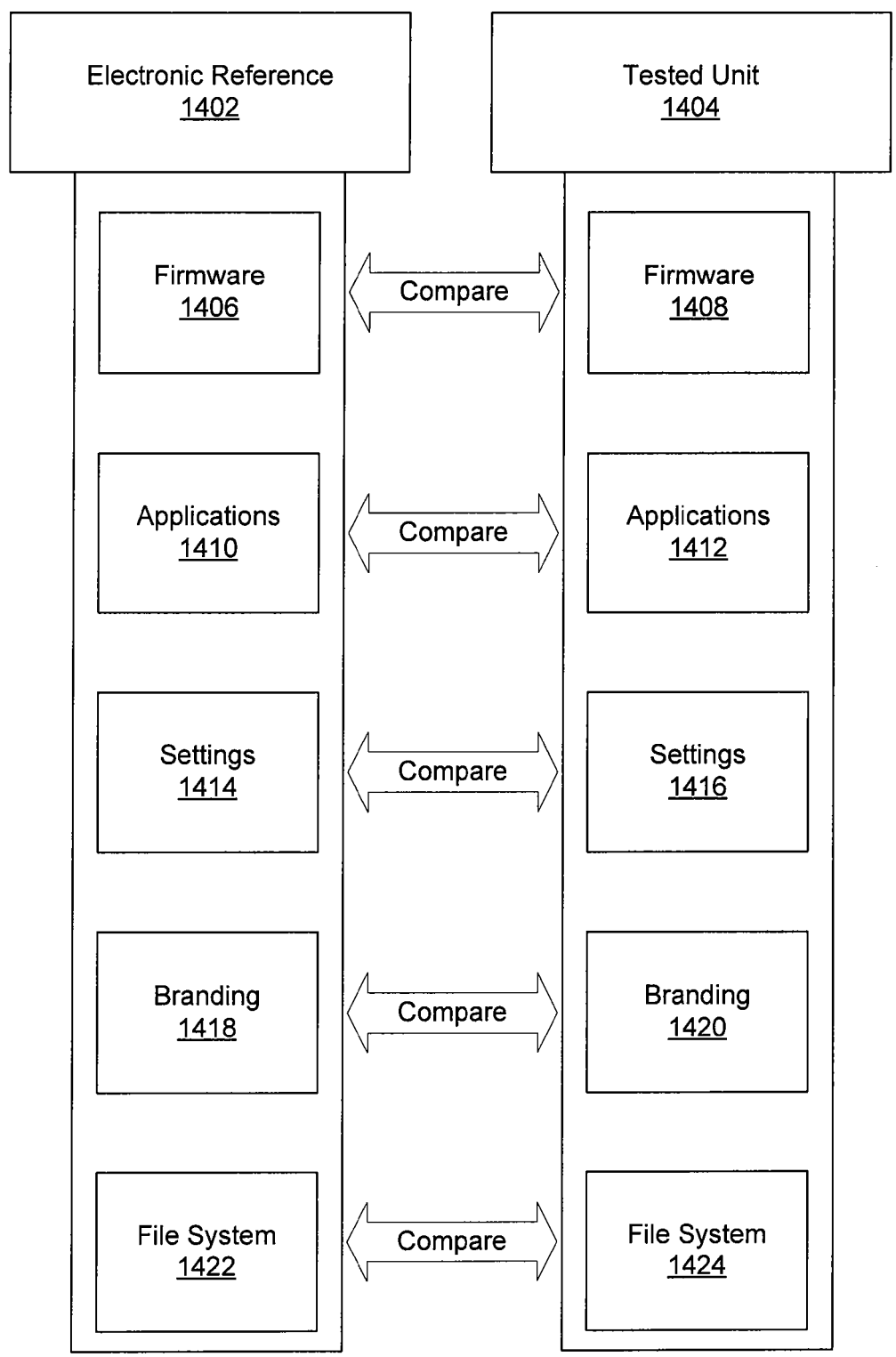
FIG. 14 is a pictorial representation of a software verification process in accordance with an illustrative embodiment.

FIG. 14 is a pictorial representation of a software verification process in accordance with an illustrative embodiment. In one embodiment, the process of FIG. 14 may be implemented by the software verification application 1300 of FIG. 13. An electronic reference 1402 and a tested unit 1404 may be compared to perform the software verification. For example, integrated or externally attached volatile and non-volatile memories of the tested unit 1404 may be scanned, analyzed, or read. The tested unit 1404 may include electronic references including firmware 1408, applications 1412, settings 1416, branding 1420, and a file system 1424 that are compared against the corresponding portions of the electronic reference 1402 that act as a standard or default for comparison.

The firmware 1406 and 1408, applications 1410 and 1412, settings 1414 and 1416, branding 1418 and 1420, and file system 1422 and 1424 may be compared to one another utilizing data, information, or memory comparisons. The firmware 1406, applications 1410, settings 1414, branding 1418, and file system 1422 of the electronic reference 1402 may include a gold standard, memory map, default content, ideal or required content and setting, or golden image that is compared against the respective software of the tested unit 1404.

The electronic reference 1402 and associated information may be updated through a database, website, or other forms of secure communication. For example, the electronic reference may include content specified by the OEM, communications service provider, and/or other interested parties. The electronic reference 1402 may be specified by the different parties or retrieved from different available resources. For example, firmware may be retrieved from a first database associated with a hardware manufacturer and branding may be retrieved from a second database associated with the communications service provider. The firmware 1406, applications 1410, settings 1414, branding 1418, and file system 1422 may be specific to the make, model, firmware/software version, service provider, associated organization, and/or other specified information. The standard images may be generated by taking a known specific make, model, carrier, firmware tool and using the software verification application 1300 to read the electronic device and generate a reference unit. The reference unit may then be tested to create exceptions, such as device specific information, operating system temporary files, or logs that may differ per electronic device.

The process of FIG. 14 may be performed for one or more units under test including the tested unit 1404 simultaneously, serially, or concurrently. In one embodiment, the verification may be performed for each of the described components serially. For example, the process may be performed by a logic engine or processor, such as a results analyzer. The results analyzer may take into account any device specific data, temporary or operating system files, or other data or files that vary by device or other criteria.

The results produced during FIG. 14 indicate whether the tested unit 1404 has the correct firmware 1406, applications 1410, settings 1414, branding 1418, and file system 1422. In addition, the software may reflash the device, remove CPI, record or report inconsistencies or unacceptable data, anomalies, or configurations, or otherwise reformat the tested unit 1404 in response to detecting unacceptable firmware, applications, settings, branding, or file system 1424. The verification process is utilized to verify that the tested unit 1404 is ready to be redistributed and complies with policies, laws, industry practices, and other requirements for the configuration and information of the tested unit 1404. In response to the tested unit 1404 passing the verification tests and processes, the tested unit 1404 may be further processed. For example, the tested unit 1404 may be packaged for shipping or otherwise prepared to be sent to a user, organization, or other party.

The previous detailed description is of a small number of embodiments for implementing the invention and is not intended to be limiting in scope. The following claims set forth a number of the embodiments of the invention disclosed with greater particularity.

What is claimed:

1. A method for performing software verification for an electronic device, the method comprising:
    automatically scanning a memory of the electronic device for electronic references utilizing a processing system coupled with the electronic device, wherein the electronic references includes a current device firmware version, a current device software version, a current device applications, a current device settings, and a current device branding;
    determining the electronic references of the electronic device utilizing the processing system in response to the scanning including determining the current device firmware version, the current device software version, the current device applications, the current device settings, and the current device branding;
    retrieving standard electronic references from a database accessible to the processing system, wherein the standard electronic references include at least default device settings, and wherein the standard electronic references are specific to make, a model, a firmware version, a software version, and a service provider associated with the electronic device;
    comparing, utilizing the processing system, the electronic references of the electronic device against standard electronic references to determine results, wherein the results indicate whether the current device firmware version matches the firmware version of the standard electronic references, and whether the current device software version matches the software version of the standard references;
    determining, via the processing system coupled with the electronic device, the current device firmware version and the current device software version do not match the firmware version and the software version of the standard electronic references, respectively;
    processing the electronic device in response to the results, wherein processing the electronic device includes updating the current device firmware version to match the firmware version of the standard electronic references in response to the determination that the current device firmware version did not match the firmware version of the standard electronic references, and updating the current device software version in response to the determination that the current device software version did not match the software version of the standard electronic references;
        wherein the updating of the current device firmware version and the updating of the current device software version of the electronic device is controlled remotely from the electronic device by the processing system coupled to the electronic device, where, as part of the processing step, the processing system removes the current device firmware version and the current device software version and replaces each, respectively, with the firmware version and the software version of the standard electronic references; and
    recording, by the processing system, the results and the processing performed for the electronic device for subsequent tracking.

2. The method according to claim 1, wherein the standard electronic references include branding associated with a communications service provider of the electronic device, wherein the branding includes at least start up graphics, wallpapers, and themes associated with the communications service provider, and wherein processing the electronic device includes updating the current device branding with the branding of the standard electronic references.

3. The method according to claim 1, processing system is warehouse management system in a logistics facility, and wherein the results indicate whether the electronic references of the electronic device are acceptable or unacceptable.

4. The method according to claim 3, further comprising:
    shipping the electronic device to a user in response to the results indicating that the electronic references are acceptable.

5. The method according to claim 1, further comprising:
    determining whether a file system includes customer personal information (CPI);
    removing the CPI in response to determining the file system includes the CPI; and
    reporting the CPI in response to determining a file system includes CPI.

6. The method according to claim 1, wherein the default device settings include at least radio, on language packs, and carrier ringtones.

7. The method according to claim 1, wherein the retrieving the standard electronic references from a database comprises:
    retrieving a first portion of the standard electronic references from a first database associated with a first party; and
    retrieving a second portion of the standard electronic references from a second database associated with a second party.

8. The method according to claim 1, wherein automatically scanning the memory of the electronic device for electronic references utilizing the processing system includes scanning external memory attached to the electronic device.

9. The method according to claim 1, wherein processing includes determining whether a file system includes customer personal information (CPI) and removing the CPI in response to determining the file system includes the CPI.

* * * * *